(12) United States Patent
Iwashita et al.

(10) Patent No.: US 9,809,747 B2
(45) Date of Patent: *Nov. 7, 2017

(54) LIQUID CRYSTAL COMPOSITION AND LIQUID CRYSTAL DISPLAY ELEMENT USING THE SAME

(71) Applicant: DIC Corporation, Tokyo (JP)

(72) Inventors: Yoshinori Iwashita, Saitama (JP); Masahiro Niwa, Saitama (JP)

(73) Assignee: DIC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/342,912

(22) PCT Filed: Oct. 12, 2012

(86) PCT No.: PCT/JP2012/076471
§ 371 (c)(1),
(2) Date: Nov. 13, 2015

(87) PCT Pub. No.: WO2014/057578
PCT Pub. Date: Apr. 17, 2014

(65) Prior Publication Data
US 2016/0075945 A1    Mar. 17, 2016

(51) Int. Cl.
*C09K 19/44* (2006.01)
*C09K 19/30* (2006.01)
(Continued)

(52) U.S. Cl.
CPC .......... *C09K 19/3003* (2013.01); *C09K 19/44* (2013.01); *C09K 2019/123* (2013.01);
(Continued)

(58) Field of Classification Search
CPC ...... C09K 2019/123; C09K 2019/3004; C09K 2019/3009; C09K 2019/301; C09K 2019/3016; C09K 2019/3025
See application file for complete search history.

(56) References Cited

U.S. PATENT DOCUMENTS 8,361,344 B2 * 1/2013 Yanai ................. C09K 19/3001
                                                            252/299.01
8,906,472 B2 * 12/2014 Kuriyama ............ C09K 19/062
                                                            252/299.5
(Continued)

FOREIGN PATENT DOCUMENTS

CN    102433130 A    5/2012
JP    06-235925 A    8/1994
(Continued)

OTHER PUBLICATIONS

International Search Report, dated Dec. 25, 2012, issued in corresponding application No. PCT/JP2012/076471.
(Continued)

*Primary Examiner* — Chanceity Robinson
(74) *Attorney, Agent, or Firm* — Westerman, Hattori, Daniels & Adrian, LLP

(57) ABSTRACT

An object of the present invention is to provide a liquid crystal composition in which various characteristics of a liquid crystal display element such as a dielectric anisotropy, a viscosity, a nematic phase upper limit temperature, and $\gamma_1$, and a burn-in characteristic of a display element are not deteriorated, dropping mark is unlikely to be generated during preparation, a compound represented by liquid crystal composition Formula (I) suitable for a liquid crystal display element in which a discharging amount of the liquid crystal material stable in an ODF step is realized is contained, and a compound represented by General Formula (II) is contained by equal to or more than 15%, and a liquid crystal display element using the same.

14 Claims, 1 Drawing Sheet

(51) Int. Cl.
*C09K 19/12* (2006.01)
*G02F 1/00* (2006.01)

(52) U.S. Cl.
CPC ............. *C09K 2019/301* (2013.01); *C09K 2019/3004* (2013.01); *C09K 2019/3009* (2013.01); *C09K 2019/3016* (2013.01); *C09K 2019/3027* (2013.01); *G02F 1/0045* (2013.01)

(56) References Cited

U.S. PATENT DOCUMENTS

| | | | |
|---|---|---|---|
| 9,062,249 B2* | 6/2015 | Ogawa | C09K 19/44 |
| 9,193,906 B2* | 11/2015 | Ogawa | C09K 19/3003 |
| 2011/0043747 A1 | 2/2011 | Kawasaki et al. | |
| 2011/0097519 A1 | 4/2011 | Yanai et al. | |
| 2012/0181478 A1 | 7/2012 | Hattori et al. | |
| 2012/0305843 A1* | 12/2012 | Klasen-memmer | C09K 19/3048 252/299.61 |
| 2013/0183460 A1* | 7/2013 | Klasen-Memmer | C09K 19/062 428/1.4 |
| 2013/0265527 A1 | 10/2013 | Takeuchi et al. | |
| 2013/0334462 A1 | 12/2013 | Sudo et al. | |
| 2013/0335693 A1 | 12/2013 | Klassen-Memmer et al. | |
| 2015/0259601 A1 | 9/2015 | Sudo et al. | |

FOREIGN PATENT DOCUMENTS

| | | |
|---|---|---|
| JP | 2002-357830 A | 12/2002 |
| JP | 2006-058755 A | 3/2006 |
| JP | 2008-505235 A | 2/2008 |
| JP | 2010-037510 A | 2/2011 |
| JP | 2011-042696 A | 3/2011 |
| JP | 2011-089082 A | 5/2011 |
| JP | 2012-513483 A | 6/2012 |
| JP | 2012-136623 A | 7/2012 |
| WO | 2010/016389 A1 | 2/2010 |
| WO | 2010/072370 A1 | 7/2010 |
| WO | 2012043386 A1 | 4/2012 |
| WO | 2012086504 A1 | 6/2012 |

OTHER PUBLICATIONS

Extended European Search Report dated Nov. 30, 2015, issued in counterpart European Patent Application No. 12886375.0. (8 pages).

* cited by examiner

LIQUID CRYSTAL COMPOSITION AND LIQUID CRYSTAL DISPLAY ELEMENT USING THE SAME

TECHNICAL FIELD

The present invention relates to a liquid crystal composition and a liquid crystal display element useful as a constituent member of a liquid crystal display device and the like.

BACKGROUND ART

The liquid crystal display element is used in various kinds of measuring equipment, a panel for an automobile, a word processor, an electronic organizer, a printer, a computer, a TV, a clock, an advertising display board and the like including a watch and a calculator. The representative examples of a liquid crystal display method include a TN (twisted nematic) type, an STN (super twisted nematic) type, a VA (vertical alignment) type and an IPS (in-plane switching) type using a TFT (thin film transistor). The liquid crystal composition used in these liquid crystal display elements is required to be stable with respect to external factors such as water, air, heat and light, and to exhibit a liquid crystal phase in as wide a temperature range around room temperature as possible, and to have a low viscosity and a low driving voltage. Furthermore, the liquid crystal composition consists of several kinds of compounds to several dozens of compounds in order to make an optimal dielectric anisotropy ($\Delta\epsilon$) and/or refractive index anisotropy ($\Delta n$) be optimal values with respect to each display element.

In a vertical alignment type display, a liquid crystal composition having a negative $\Delta\epsilon$ is used, and the display is widely used in a liquid crystal TV. On the other hand, in all the driving methods, a low voltage driving, a high speed response, and a wide operating temperature range are required. That is to say, it is required for $\Delta\epsilon$ to have a positive and high absolute value, for viscosity ($\eta$) to be low, and for a nematic phase-isotropic liquid phase transition temperature ($T_{ni}$) to be high. In addition, it is necessary to adjust $\Delta n$ of the liquid crystal composition to an appropriate range in accordance with a cell gap by setting $\Delta n \times d$ which is a product of $\Delta n$ and the cell gap (d). Additionally, in the case where the liquid crystal display element is applied to a TV and the like, the liquid crystal composition is required to have a low $\gamma_1$ since high speed response property is emphasized.

In the related art, compounds having a dialkyl bicyclohexane skeleton were generally used in order to form the liquid crystal composition having a low $\gamma_1$ (refer to PTL 1). However, bicyclohexane compounds have a high effect on reducing $\gamma_1$, and generally, in compounds having a high vapor pressure with a short alkyl chain length, the tendency is particularly remarkable. Moreover, since $T_{ni}$ also tends to be low in the alkyl bicyclohexane compounds, compounds in which the total side chain length is equal to or more than 7 carbon atoms are used in many cases, and at the present time, compounds having a short side chain length have not been sufficiently examined.

There are compositions known as a liquid crystal composition using a dialkyl bicyclohexane compound having a short side chain length (refer to PTL 2), a compound having a three-ring structure as a compound having a negative dielectric anisotropy is widely used, and a balance of physical properties as a whole is obtained using compounds having a difluoroethylene skeleton. However, the difluoroethylene skeleton used in the composition has a problem in that the stability thereof is low with respect to light, and therefore, development of the liquid crystal composition in which such a compound is not used is desired.

On the other hand, the application of the liquid crystal display element is expanded, great changes are seen in the usage method and the preparing method thereof, and in order to cope with the changes, optimization of characteristics other than fundamental physical property values known in the related art is demanded. That is to say, as the liquid crystal display element which uses the liquid crystal composition, a VA (vertical alignment) type and an IPS (in-plane switching) type are widely used, a display element of which the size is also an extra-large size of equal to or longer than 50 inches is put into practical use and is used. With the increase in the substrate size, in an injection method of the liquid crystal composition into a substrate, the mainstream type of the injection method has been changed from a vacuum injection method in the related art to a drop injection (ODF: One Drop Fill) method (refer to PTL 3), and the problem in that dropping mark generated when the liquid crystal composition is dropped on a substrate leads to a decrease in display quality became an issue. Furthermore, a PS liquid crystal display element (polymer stabilized) and a PSA liquid crystal display element (polymer sustained alignment) are developed for the purpose of production of a pretilt angle of a liquid crystal material in a liquid crystal display element and a high speed response property (refer to PTL 4), and this problem became a bigger problem. That is to say, these display elements have a characteristic that a monomer is added to the liquid crystal composition, and the monomer in the composition is cured. Since the liquid crystal composition for an active matrix needs to maintain a high voltage holding ratio, compounds that can be used are specified, and the compounds having an ester bond in the compound is limitingly used. The monomer used in the PSA liquid crystal display element is mainly acrylate, generally, it has an ester bond in the compound, and such compounds are not normally used as the liquid crystal compound for the active matrix (refer to PTL 4). Such foreign materials induce the generation of a dropping mark, and there is a problem in that the yield of the liquid crystal display element is deteriorated by a display defect. In addition, even when additives such as an antioxidant, and a light absorber are added in the liquid crystal composition, there is a problem in that the yield is deteriorated.

Here, the dropping mark is defined as a phenomenon in which, in the case where a black color is displayed, a white mark formed by dropping of the liquid crystal composition comes up to the surface.

For the suppression of the dropping mark, a method in which the dropping mark which is generated in relation to the alignment control film by forming a polymer layer in the liquid crystal layer by polymerization of polymerizable compound mixed in the liquid crystal composition is suppressed is disclosed (refer to PTL 5). However, in this method, there is a problem of burn-in of the display due to the polymerizable compound added to the liquid crystal, and the effect for suppressing the dropping mark is also insufficient. And therefore, development of the liquid crystal display element in which the fundamental characteristics of the liquid crystal display element are maintained, and the burn-in and the dropping mark are unlikely to be generated is required.

CITATION LIST

Patent Literature

[PTL 1] Japanese Unexamined Patent Application (Translation of PCT Application) No. 2008-505235
[PTL 2] Japanese Unexamined Patent Application, First Publication No. 2012-136623
[PTL 3] Japanese Unexamined Patent Application, First Publication No. H06-235925
[PTL 4] Japanese Unexamined Patent Application, First Publication No. 2002-357830
[PTL 5] Japanese Unexamined Patent Application, First Publication No. 2006-58755

SUMMARY OF INVENTION

Technical Problem

An object of the present invention is to provide a liquid crystal composition in which various characteristics of a liquid crystal display element such as a dielectric anisotropy, a viscosity, a nematic phase upper limit temperature, a nematic phase stability at low temperature and $\gamma_1$, and a burn-in characteristic of the display element are not deteriorated, dropping mark is unlikely to be generated during preparation, and which is suitable for a liquid crystal display element in which a discharging amount of a liquid crystal material stable in an ODF step is realized, and a liquid crystal display element using the same.

Solution to Problem

In order to solve the above problem, the present inventors have studied the configurations of various liquid crystal compositions which are optimal to the preparation of the liquid crystal display element by a dropping method, and have found that the generation of the dropping mark in the liquid crystal display element can be suppressed by using a specific liquid crystal compound at a specific mixing ratio, thereby completing the present invention.

The present invention provides a liquid crystal composition with a negative dielectric anisotropy which contains a compound represented by Formula (I), and a compound represented by General Formula (II) in an amount equal to or more than 15% by mass, and a liquid crystal display element using the liquid crystal composition.

[Chem. 1]

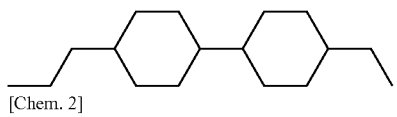

(I)

[Chem. 2]

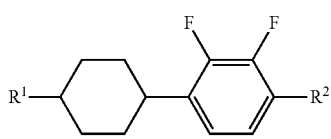

(II)

(In the formula, each of $R^1$ and $R^2$ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms. One or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded.)

Advantageous Effects of Invention

Since the liquid crystal display element of the present invention has characteristics in which high speed response property is excellent, and generation of burn-in is low, and generation of the dropping mark due to the preparation is low, it is useful for a display element of a liquid crystal TV, a monitor and the like.

DESCRIPTION OF EMBODIMENTS

Figure 1:
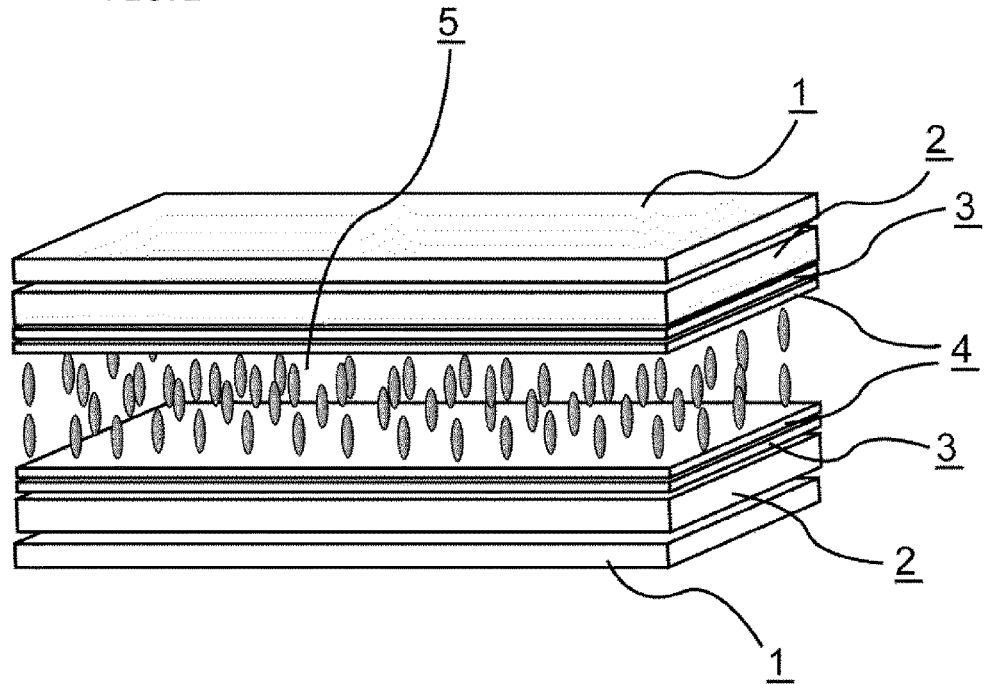
FIG. 1 is an example of a configuration of a liquid crystal display element of the present invention.

As described above, a generation process of a dropping mark is not clear at present, however, there is a high possibility that interaction between impurities in a liquid crystal compound and alignment film, chromatography phenomenon and the like are involved. The impurities in the liquid crystal compound are significantly influenced by a preparation process of the compound, and for example, it is not necessarily guaranteed that a preparation method of compound is the same even if only the number of carbon atoms of a side chain is different. That is to say, since the liquid crystal compound is prepared by a precise preparation process, the cost is high among chemicals, and therefore, an improvement in preparation efficiency is strongly required. For this reason, in order to use cheap raw materials as much as possible, for example, there is also a case where a method in which preparation is performed from completely different kind of raw materials, even if only one in the number of carbon atoms of a side chain, is different has more excellent efficiency. Accordingly, the preparation process of a liquid crystal bulk is different for each bulk, and for example, in most cases, the raw materials are different even if the process is the same, and as a result, there are many cases where impurities which are different according to each bulk are incorporated. However, there is a possibility that the dropping mark is also generated by trace amount of impurities, and therefore, there is a limit to suppress the generation of the dropping mark by only purification of the bulk.

On the other hand, the preparation method of the liquid crystal bulk which is widely used tends to be uniformly determined with respect to each bulk, after establishing the preparation process. Even at the present time when analytical techniques are developed, it is not easy to fully identify the incorporated impurities, and therefore, it is necessary to perform the design of the composition with the assumption that fixed impurities are incorporated into each bulk. The inventors of the present invention have conducted studies regarding a relation between impurities of the liquid crystal bulk and the dropping mark, and as a result, empirically found that impurities which are unlikely to generate the dropping mark, and impurities which are likely to generate the dropping mark are present even when the impurities are included in the composition. Accordingly, in order to suppress the generation of the dropping mark, it is important to use a specific compound at a specific mixing ratio, and in particular, the presence of compositions which are unlikely to generate the dropping mark is found. A preferred aspect of the embodiment described below has been found from the viewpoint of the above-described description.

In the liquid crystal composition of the present invention, the compound represented by Formula (I) is contained as a first component, and it is preferably contained in the range of 10% to 40%, more preferably in the range of 10% to 35%, more preferably in the range of 15% to 35%, still more preferably in the range of 15% to 30%, and particularly preferably in the range of 15% to 25%, and more specifically, in the case where a response speed is emphasized, it is preferably contained in the range of 20% to 30%, more preferably in the range of 20% to 25%, and in the case where a driving voltage is emphasized and in the case where a reliability of a voltage holding ratio is emphasized, it is preferably contained in the range of 15% to 20%.

The compound represented by General Formula (II) is contained by equal to or more than 15% as a second component, and it is preferably contained in the range of 15% to 25%, and more preferably contained in the range of 15% to 20%.

In General Formula (II), $R^1$ represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms, and preferably represents an alkyl group having 1 to 8 carbon atoms and an alkenyl group having 2 to 8 carbon atoms, more preferably represents an alkyl group having 1 to 8 carbon atoms, more preferably represents an alkyl group having 3 to 5 carbon atoms, and still more preferably represents an alkyl group having 3 or 5 carbon atoms.

In General Formula (II), $R^2$ represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms, and preferably represents an alkyl group having 1 to 8 carbon atoms or an alkoxy group having 1 to 8 carbon atoms, more preferably represents an alkyl group having 3 to 5 carbon atoms or an alkoxy group having 2 to 4 carbon atoms, more preferably represents an alkyl group having 3 or 5 carbon atoms or alkoxy group having 2 or 4 carbon atoms, and still more preferably represents an alkoxy group having 2 or 4 carbon atoms.

In the case where improvement in the response speed of the display element is emphasized, an alkenyl group is preferable, and in the case where reliability of the voltage holding ratio is emphasized, an alkyl group is preferable. In the case where $R^1$ and $R^2$ represent alkenyl groups, the following structures are preferable.

[Chem. 1]

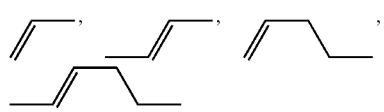

(In the formula, the right terminal is bonded to a ring structure.)

$R^1$ represents an alkyl group having 3 to 5 carbon atoms, $R^2$ represents an alkoxy group having 2 to 4 carbon atoms, the content of the compound represented by General Formula (II) is preferably equal to or more than 50% in the compound represented by General Formula (II), more preferably equal to or more than 70%, and still more preferably equal to or more than 80%.

As the compound represented by General Formula (II), specifically, the compounds represented by Formulas (II-1) to (II-8) described below are preferable, the compounds represented by Formulas (II-1) to (II-4) are more preferable, the compounds represented by Formulas (II-1) to (II-3) are still more preferable, and the compound represented by Formula (II-1) is particularly preferable.

[Chem. 2]

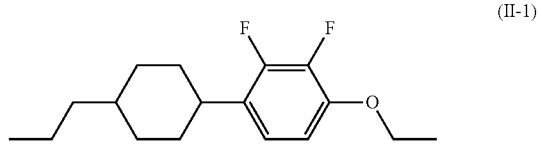
(II-1)

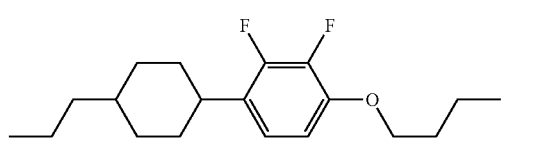
(II-2)

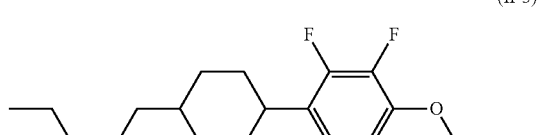
(II-3)

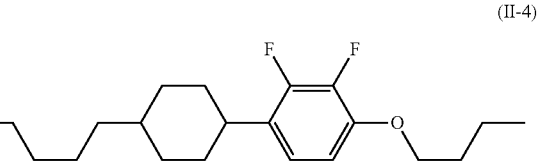
(II-4)

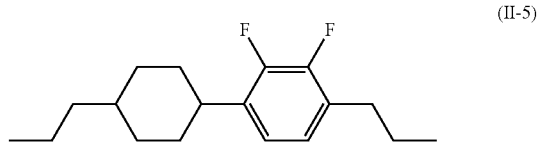
(II-5)

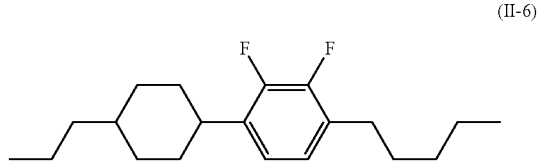
(II-6)

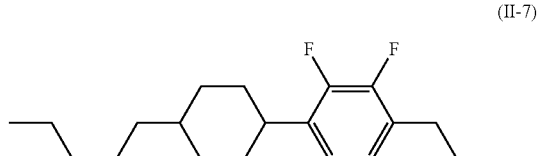
(II-7)

(II-8)

The compound represented by General Formula (II) is contained by equal to or more than 15%, and the compound represented by Formula (II-1) is preferably contained by equal to or more than 15%.

The liquid crystal composition of the present invention preferably contains the compound represented by General Formula (III) as a third component.

[Chem. 3]

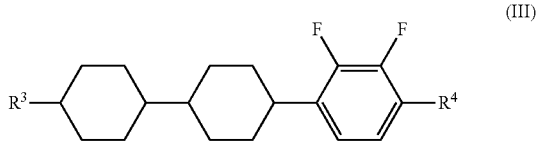

(III)

(In the formula, each of $R^3$ and $R^4$ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms. One or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded.)

In the case where the compound represented by General Formula (III) is contained, it is preferably contained in the range of 5% to 35%, more preferably contained in the range of 10% to 30%, and still more preferably contained in the range of 15% to 20%.

In General Formula (III), $R^3$ preferably represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms, and preferably represents an alkyl group having 1 to 8 carbon atoms or an alkenyl group having 2 to 8 carbon atoms, more preferably represents an alkyl group having 1 to 8 carbon atoms, still more preferably represents an alkyl group having 2 to 5 carbon atoms, and particularly preferably represents an alkyl group having 3 to 5 carbon atoms. In General Formula (III), $R^4$ preferably represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms, and preferably represents an alkyl group having 1 to 8 carbon atoms or an alkoxy group having 1 to 8 carbon atoms, more preferably represents an alkyl group having 1 to 5 carbon atoms or an alkoxy group having 1 to 4 carbon atoms, still more preferably represents an alkoxy group having 1 to 4 carbon atoms, and particularly preferably represents an alkoxy group having 2 or 3 carbon atoms.

In the case where the improvement in the response speed of the display element is emphasized, an alkenyl group is preferable, and in the case where the reliability of the voltage holding ratio is emphasized, an alkyl group is preferable. In the case where $R^3$ and $R^4$ represent an alkenyl group, the following structures are preferable.

[Chem. 4]

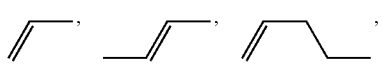

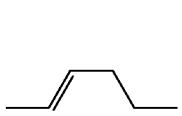

(In the formula, the right terminal is bonded to a ring structure.)

As the compound represented by General Formula (III), specifically, the compounds represented by Formulas (III-1) to (III-6) described below are preferable, the compounds represented by Formulas (III-1) to (III-4) are more preferable, and the compounds represented by Formulas (III-1) to (III-3) are still more preferable.

[Chem. 5]

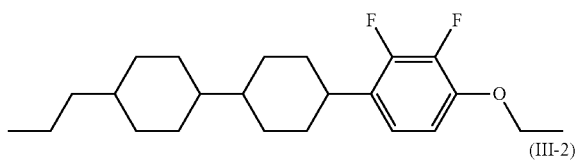

(III-1)

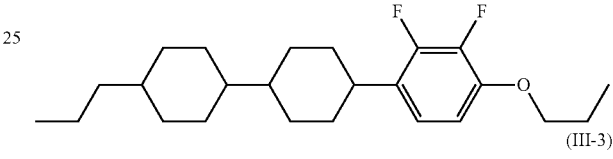

(III-2)

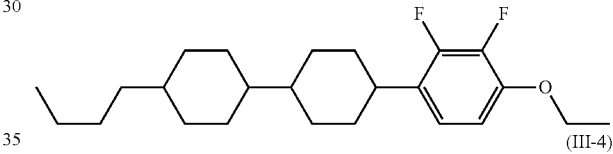

(III-3)

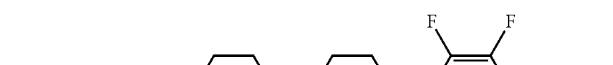

(III-4)

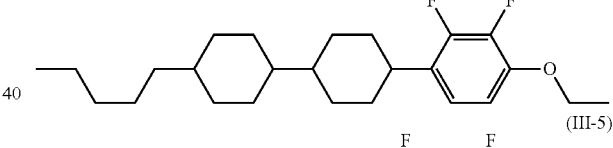

(III-5)

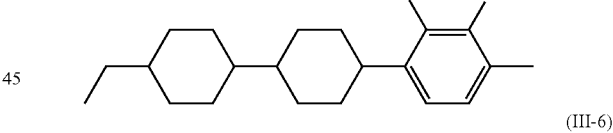

(III-6)

The liquid crystal composition of the present invention preferably contains the compound represented by General Formula (IV) as a fourth component.

[Chem. 6]

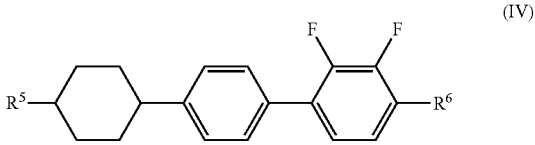

(IV)

(In the formula, each of $R^5$ and $R^6$ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms. One or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded.)

In the case where the compound represented by General Formula (IV) is contained, it is preferably contained in the range of 5% to 30%, more preferably contained in the range of 10% to 25%, and still more preferably contained in the range of 10% to 20%.

In General Formula (IV), $R^5$ preferably represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms, and preferably represents an alkyl group having 1 to 8 carbon atoms or an alkenyl group having 2 to 8 carbon atoms, more preferably represents an alkyl group having 1 to 8 carbon atoms, still more preferably represents an alkyl group having 2 to 5 carbon atoms, and particularly preferably represents an alkyl group having 2 or 3 carbon atoms.

In General Formula (IV), $R^6$ preferably represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms, and preferably represents an alkyl group having 1 to 8 carbon atoms or an alkoxy group having 1 to 8 carbon atoms, more preferably represents an alkyl group having 1 to 5 carbon atoms or an alkoxy group having 1 to 4 carbon atoms, still more preferably represents an alkoxy group having 1 to 4 carbon atoms, particularly preferably represents an alkoxy group having 2 or 3 carbon atoms, and most preferably represents an alkoxy group having 2 carbon atoms.

In the case where the improvement in the response speed of the display element is emphasized, an alkenyl group is preferable, and in the case where the reliability of the voltage holding ratio is emphasized, an alkyl group is preferable. In the case where $R^5$ and $R^6$ represent an alkenyl group, the following structures are preferable.

[Chem. 7]

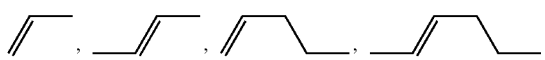

(In the formula, the right terminal is bonded to a ring structure.)

As the compound represented by General Formula (IV), specifically, the compounds represented by Formulas (IV-1) to (IV-4) described below are preferable, and more specifically, the compounds represented by Formulas (IV-1) or (IV-2) are preferable.

[Chem. 8]

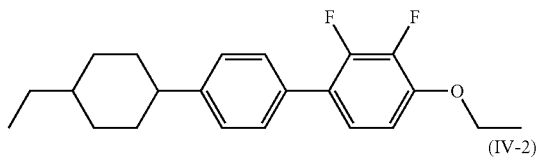
(IV-1)

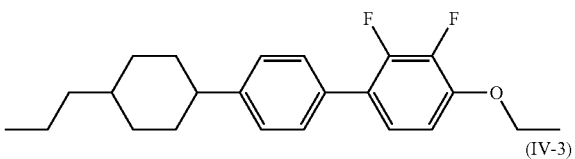
(IV-2)

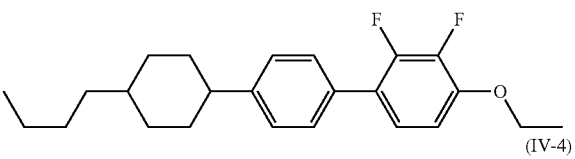
(IV-3)

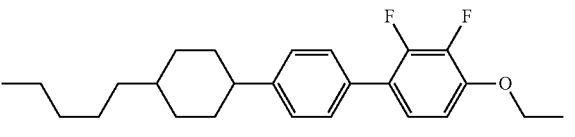
(IV-4)

The liquid crystal composition of the present invention preferably contains the compound represented by General Formula (V) as a fifth component.

[Chem. 9]

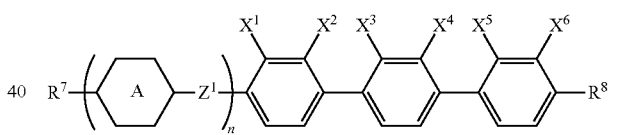
(V)

(In the formula, each of R7 and R8 independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms; one or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded; A represents a 1,4-cyclohexylene cyclohexylene group, a 1,4-phenylene group or a tetrahydropyran-2,5-diyl group, and in the case where A represents a 1,4-phenylene group, one or more hydrogen atoms of the 1,4-phenylene group may be substituted with fluorine; Z1 represents a single bond, —OCH2-, —OCF2-, —CH2O— or CF2O—; n is 0 or 1; and each of X1 to X6 independently represents a hydrogen atom or a fluorine atom, provided that at least one of X1 to X6 represents a fluorine atom.)

In the case where the compound represented by General Formula (V) is contained, it is preferably contained in the range of 3% to 20%, more preferably contained in the range of 5% to 15%, and the proportion of the compound represented by Formulas (IV-1) and (IV-2) in the compound represented by General Formula (V) is preferably equal to or more than 50%, more preferably equal to or more than 75%, and still more preferably equal to or more than 90%.

In General Formula (V), each of $R^7$ and $R^8$ independently preferably represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms, and preferably represents an alkyl group having 1 to 8 carbon atoms or an alkenyl group having 2 to 8 carbon atoms, more preferably represents an alkyl group having 1 to 8 carbon atoms, still more preferably represents an alkyl group having 2 to 5 carbon atoms, particularly preferably represents an alkyl group having 3 to 5 carbon atoms, and each of the numbers of carbon atoms of $R^1$ and $R^2$ is most preferably different.

In the case where the improvement in the response speed of the display element is emphasized, an alkenyl group is preferable, and in the case where the reliability of the voltage holding ratio is emphasized, an alkyl group is preferable. In the case where $R^7$ and $R^8$ represent an alkenyl group, the following structures are preferable.

[Chem. 10]

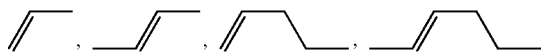

(In the formula, the right terminal is bonded to a ring structure.)

In General Formula (V), each of $X^1$ to $X^6$ independently preferably represents a hydrogen atom or a fluorine atom, and one to five among these are preferably fluorine atoms, one to four are more preferably fluorine atoms, one to three are more preferably fluorine atoms, one to two are still more preferably fluorine atoms, and two are most preferably fluorine atoms.

In this case, in the case where a fluorine atom is one, any one of $X^3$ to $X^6$ is preferably a fluorine atom, $X^3$ or $X^4$ is more preferably a fluorine atom, in the case where fluorine atom is two, any two of $X^3$ to $X^6$ are preferably fluorine atoms, $X^3$, $X^4$, $X^5$ and $X^6$ are more preferably fluorine atoms, $X^3$ and $X^4$ are still more preferably fluorine atoms, in the case where a fluorine atom is equal to or more than three, at least $X^3$ and $X^4$ or at least $X^5$ and $X^6$ are preferably fluorine atoms, and at least $X^3$ and $X^4$ are more preferably fluorine atoms.

In General Formula (V), A preferably represents 1,4-cyclohexylene, 1,4-phenylene or tetrahydropyran-2,5-diyl, and in the case where the response speed in a display element and a liquid crystal display prepared using the liquid crystal composition is emphasized, A preferably represents 1,4-phenylene or tetrahydropyran-2,5-diyl, more preferably 1,4-phenylene, in the case where the driving voltage is emphasized, A preferably represents 1,4-phenylene or tetrahydropyran-2,5-diyl, more preferably tetrahydropyran-2,5-diyl, in the case where an operating temperature range is emphasized, that is, in the case where a high operating temperature range is required, A preferably represents 1,4-cyclohexylene or tetrahydropyran-2,5-diyl, and more preferably 1,4-cyclohexylene, in the case where A represents 1,4-phenylene, one or more hydrogen atoms of a benzene ring may be substituted with fluorine, and non-substitution, monosubstitution and disubstitution are preferable, in the case of the monosubstitution, A preferably represents 2-fluorobenzene, and in the case of the disubstitution, A preferably represents 2,3-difluorobenzene.

In General Formula (V), $Z^1$ preferably represents a single bond, $-OCH_2-$, $-OCF_2-$, $-CH_2O-$ or $CF_2O-$, preferably represents a single bond, $-OCF_2-$ or $CF_2O-$, and more preferably represents a single bond.

In General Formula (V), n preferably represents 0 or 1, and in the case where the response speed is emphasized, n preferably represents 0, and in the case where the operating temperature range is emphasized, that is, in the case where the high operating temperature range is required, n preferably represents 1.

As the compound represented by General Formula (V), specifically, the compounds represented by General Formulas (V-1) to (V-14) described below are preferable, Formula (V-1), Formulas (V-3) to (V-9) and Formulas (V-12) to (V-15) are more preferable, Formula (V-1), Formula (V-3), Formula (V-5), Formula (V-6), Formula (V-9), Formula (V-12), Formula (V-13), and Formula (V-15) are still more preferable, and Formula (V-1), Formula (V-5) and Formula (V-6) are particularly preferable, and Formula (V-5) is most preferable.

[Chem. 11]

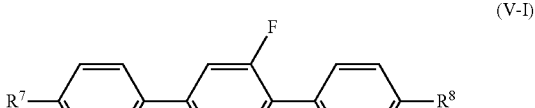

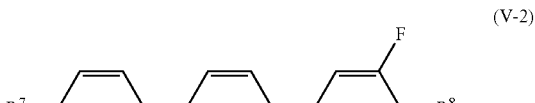

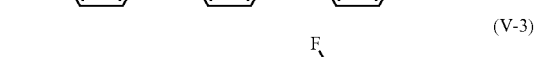

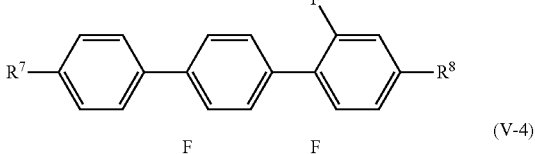

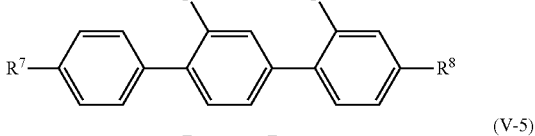

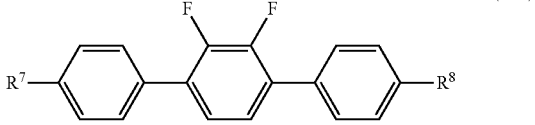

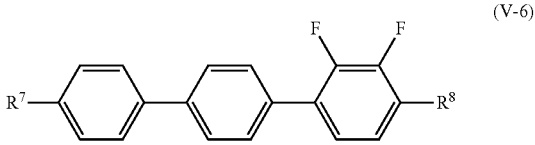

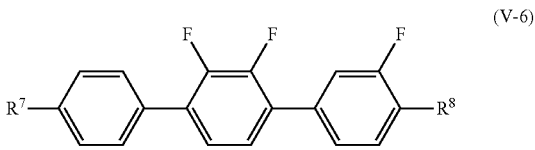

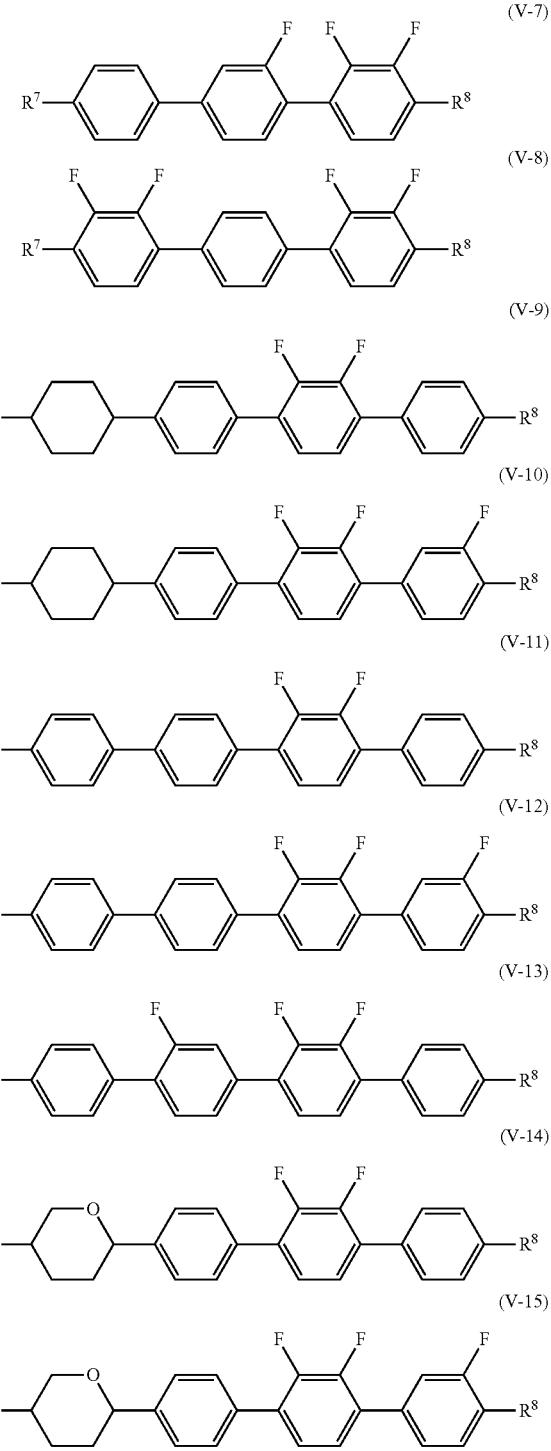

In General Formula (V), each of $R^7$ and $R^8$ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms, and preferably represents an alkyl group having 1 to 8 carbon atoms or an alkenyl group having 2 to 8 carbon atoms, more preferably represents an alkyl group having 2 to 5 carbon atoms or an alkenyl group having 2 to 5 carbon atoms, still more preferably represents an alkyl group having 2 to 5 carbon atoms, and in the case where both $R^7$ and $R^8$ are alkyl groups, each of the numbers of carbon atoms is preferably different.

In more detail, compounds in which $R^7$ represents a propyl group, and $R^8$ represents an ethyl group, or compounds in which $R^7$ represents a butyl group, and $R^8$ represents an ethyl group are preferable.

In the liquid crystal composition of the present invention, a wide range of a nematic phase-isotropic liquid phase transition temperature ($T_{NI}$) can be used, and the range is preferably in the range of 60° C. to 120° C., more preferably in the range of 70° C. to 100° C., and particularly preferably in the range of 70° C. to 90° C.

In the liquid crystal composition of the present invention, compounds of Formula (I) and General Formula (II) are essentially contained, and as a more preferable embodiment, the compounds represented by General Formulas (III) to (V) can be contained. The content in this case is preferably the contents described below.

In the case where the compounds represented by Formula (I), General Formulas (II) and (III) are contained, the total content of these components is preferably in the range of 25% to 80%, more preferably in the range of 30% to 75%, still more preferably in the range of 35% to 70%, particularly preferably in the range of 35% to 65%, and most preferably in the range of 38% to 60%.

In the case where the compounds represented by Formula (I), General Formulas (II) and (IV) are contained, the total content of these components is preferably in the range of 30% to 90%, more preferably in the range of 35% to 85%, still more preferably in the range of 40% to 80%, particularly preferably in the range of 45% to 75%, and most preferably in the range of 50% to 70%.

In the case where the compounds represented by Formula (I), General Formulas (II) and (V) are contained, the total content of these components is preferably in the range of 25% to 70%, more preferably in the range of 25% to 65%, still more preferably in the range of 25% to 60%, particularly preferably in the range of 25% to 55%, and most preferably in the range of 30% to 50%.

In the case where the compounds represented by Formula (I), General Formulas (II), (III) and (IV) are contained, the total content of these components is preferably in the range of 45% to 95%, more preferably in the range of 50% to 95%, still more preferably in the range of 55% to 95%, particularly preferably in the range of 60% to 90%, and most preferably in the range of 65% to 85%.

In the case where the compounds represented by Formula (I), General Formulas (II), (III) and (V) are contained, the total content of these components is preferably in the range of 35% to 90%, more preferably in the range of 35% to 85%, still more preferably in the range of 35% to 80%, particularly preferably in the range of 35% to 75%, and most preferably in the range of 40% to 70%.

In the case where the compounds represented by Formula (I), General Formulas (II), (IV) and (V) are contained, the total content of these components is preferably in the range of 35% to 95%, more preferably in the range of 40% to 95%, still more preferably in the range of 45% to 90%, particularly preferably in the range of 50% to 85%, and most preferably in the range of 55% to 75%.

In the case where the compounds represented by Formula (I), General Formulas (II) to (V) are contained, the total content of these components is preferably in the range of 60% to 98%, more preferably in the range of 65% to 98%, still more preferably in the range of 70% to 98%, particularly preferably in the range of 73% to 98%, and most preferably in the range of 80% to 95%.

Among respective compounds consisting of the liquid crystal composition of the present invention, the proportion occupied by a compound having two or more fluorine atoms, specifically, the compound represented by General Formulas (II), (III), (VI) and General Formula (V) including two or more fluorine atoms is preferably in the range of 40% to 80%, more preferably in the range of 45% to 75%, still more preferably in the range of 50% to 70%, and in more detail, in the case where the response speed is emphasized, the proportion is preferably in the range of 50% to 60%, and in the case where the driving voltage is emphasized, the proportion is preferably in the range of 60% to 70%.

The liquid crystal composition of the present invention can further contain a compound selected from the group represented by General Formulas (VII-a) to (VII-e).

[Chem. 12]

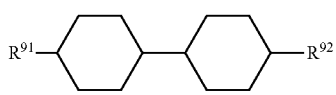
(VII-a)

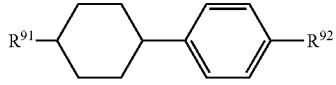
(VII-b)

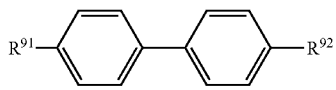
(VII-c)

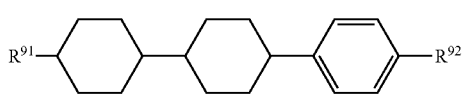
(VII-d)

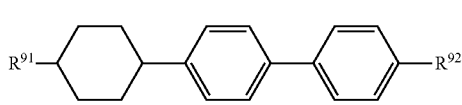
(VII-e)

(In the formula, each of $R^{91}$ and $R^{92}$ independently represents an alkyl group having 1 to 10 carbon atoms, an alkoxy group having 1 to 10 carbon atoms or an alkenyl group having 2 to 10 carbon atoms, but in General Formula (VII-a), the compound in which $R^{91}$ represents an alkyl group having 3 carbon atoms, and $R^{92}$ represents an alkyl group having 2 carbon atoms is excluded.)

In the case where a compound selected from the group represented by General Formulas (VII-a) to (VII-d) is contained, one kind to 10 kinds thereof are preferably contained, one kind to 8 kinds thereof are particularly preferably contained, one kind to 5 kinds thereof are particularly preferably contained, two kinds or more thereof are also preferably contained, and the content in this case is preferably in the range of 5% to 40%, still more preferably in the range of 5% to 35%, and particularly preferably in the range of 7% to 30%.

Each of $R^{91}$ and $R^{92}$ preferably independently represents an alkyl group having 1 to 10 carbon atoms or an alkenyl group having 2 to 10 carbon atoms, more preferably represent an alkyl group having 1 to 5 carbon atoms or an alkenyl group having 2 to 5 carbon atoms, and in the case where $R^{91}$ and $R^{92}$ represent alkenyl groups, the following structures are preferable.

[Chem. 13]

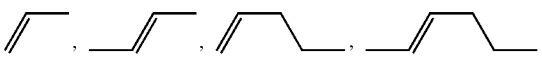

(In the formula, the right terminal is bonded to a ring structure.) The following structure is particularly preferable.

[Chem. 14]

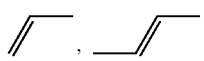

(In the formula, the right terminal is bonded to a ring structure.) Moreover, $R^{91}$ and $R^{92}$ may be the same or different, and preferably represent different substituents.

From these points of view, the compounds represented by General Formulas (VII-a) to (VII-e), more specifically, the compounds described below are preferable.

[Chem. 15]

(VII-a1)

(VII-a2)

[Chem. 16]

(VII-a11)

(VII-a11)

(VII-a12)

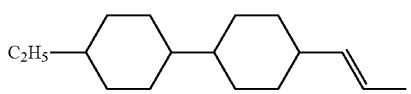
(VII-a12)

(VII-a13)

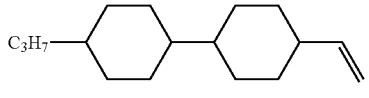
(VII-a13)

(VII-a14)

(VII-a14)

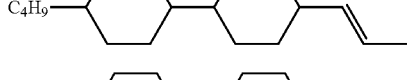

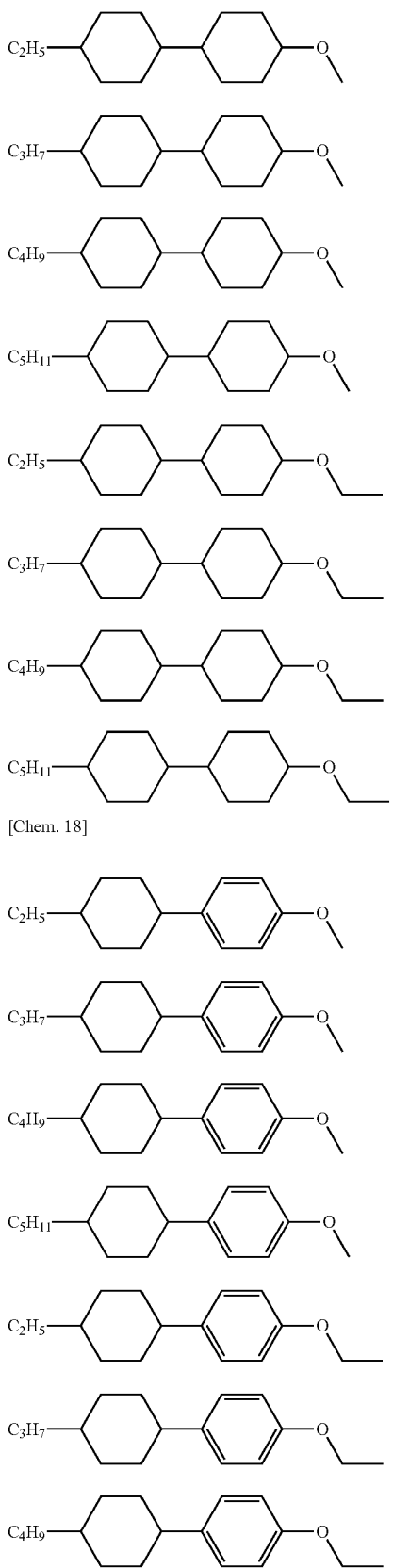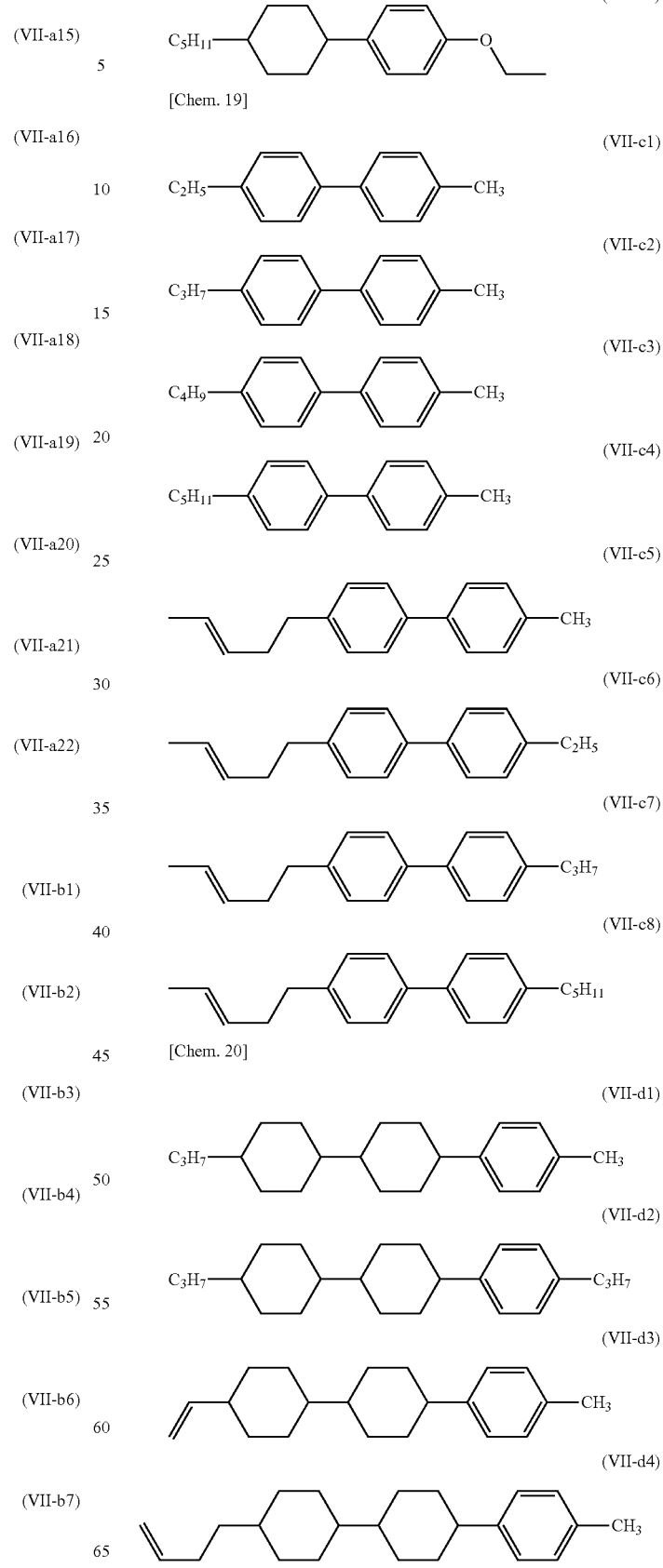

19
-continued

[Chem. 21]

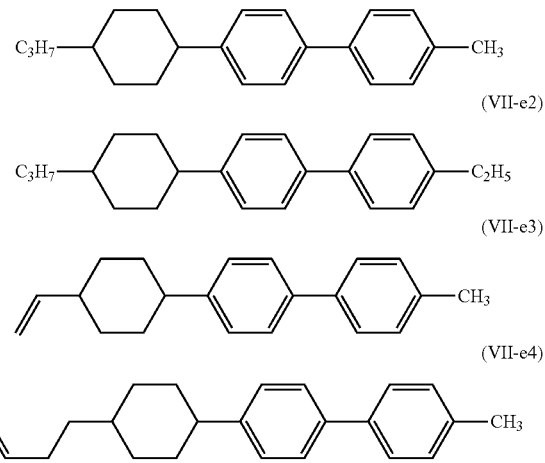

Among these, (VII-a1), (VII-a2), (VII-a16), (VII-a-18), (VII-b2), (VII-b6), (VII-c2), (VII-c4), (VII-c5), (VII-d1) to (VII-d4) or (VII-e2) are preferable.

The compound represented by General Formula (VII) has in common with the compound represented by Formula (I) in the fact that the dielectric anisotropy is substantially zero, and in the proportion of the compound of General Formula (VII) and the compound represented by Formula (I), Formula (I) is preferably in the range of 40% to 85% with respect to the total content of Formula (I) and General Formula (VII), more preferably in the range of 45% to 80%, and particularly preferably in the range of 50% to 75%. Moreover, the total content of Formula (I) and General Formula (VII) is preferably in the range of 10% to 70% with respect to the total content of composition, more preferably in the range of 15% to 65%, more preferably in the range of 20% to 60%, still more preferably in the range of 25% to 55%, and particularly preferably in the range of 30% to 50%.

In the invention, a 1,4-cyclohexyl group is preferably a trans-1,4-cyclohexyl group.

The dielectric anisotropy of the liquid crystal composition of the invention is preferably in the range of −2.0 to −6.0 at 25° C., more preferably in the range of −2.5 to −5.0, and particularly preferably in the range of −2.5 to −4.0. In more detail, in the case where the response speed is emphasized, the dielectric anisotropy is preferably in the range of −2.5 to −3.4, and in the case where the driving voltage is emphasized, the dielectric anisotropy is preferably in the range of −3.4 to −4.0.

A refractive index anisotropy of the liquid crystal composition of the invention is preferably in the range of 0.08 to 0.13 at 25° C., and more preferably in the range of 0.09 to 0.12. In more detail, in the case of corresponding to a thin cell gap, the refractive index anisotropy is preferably in the range of 0.10 to 0.12, and in the case of corresponding to a thick cell gap, the refractive index anisotropy is preferably in the range of 0.08 to 0.10.

A rotational viscosity ($\gamma_1$) of the liquid crystal composition of the invention is preferably equal to or less than 150, more preferably equal to or less than 130, and particularly preferably equal to or less than 120.

20

In the liquid crystal composition of the invention, Z which is a function of the rotational viscosity and the refractive index anisotropy preferably exhibits specific values.

$$Z = \gamma_1 / \Delta n^2 \qquad \text{[Equation 1]}$$

(In the formula, $\gamma_1$ represents the rotational viscosity, and $\Delta n$ represents the refractive index anisotropy.)

Z is preferably equal to or less than 13,000, more preferably equal to or less than 12,000, and particularly preferably equal to or less than 11,000.

The liquid crystal composition of the present invention, in the case where it is used in an active matrix display element, is required to have a specific resistance equal to or higher than $10^{12}$ (Ω·m), preferably $10^{13}$ (Ω·m), and more preferably equal to or higher than $10^{14}$ (Ω·m).

The liquid crystal composition of the present invention may contain a normal nematic liquid crystal, a smectic liquid crystal, a cholesteric liquid crystal, an antioxidant, an ultraviolet ray absorber and a polymerizable monomer depending on the use, in addition to compounds described above.

As the polymerizable monomer, a bifunctional monomer represented by General Formula (VI) is preferable.

[Chem. 22]

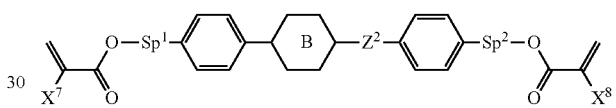

(In the formula, each of $X^7$ and $X^8$ independently represents a hydrogen atom or a methyl group, each of $Sp^1$ and $Sp^2$ independently represents a single bond, an alkylene group having 1 to 8 carbon atoms or —O—$(CH_2)_s$— (In the formula, s represents an integer from 2 to 7, and an oxygen atom is bonded to an aromatic ring.), $Z^2$ represents —OCH$_2$—, —CH$_2$O—, —COO—, —OCO—, —CF$_2$O—, —OCF$_2$—, —CH$_2$CH$_2$—, —CF$_2$CF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$═CY$^2$— (In the formula, each of $Y^1$ and $Y^2$ independently represents a fluorine atom or a hydrogen atom.), —C≡C— or a single bond, and B represents a 4-phenylene group, a trans-1,4-cyclohexylene group or a single bond, and arbitrary hydrogen atom of the entire 1,4-phenylene group in the formula may be substituted with a fluorine atom.)

Both diacrylate derivatives in which both $X^7$ and $X^8$ represent hydrogen atoms and dimethacrylate derivatives in which both $X^7$ and $X^8$ have methyl groups are preferable, and compounds in which one of $X^7$ and $X^8$ represents a hydrogen atom, and the other represents a methyl group are also preferable. In a polymerization rate of these compounds, diacrylate derivatives are the fastest, dimethacrylate derivatives are slow, and asymmetric compounds are therebetween. It is possible to use a more preferable embodiment depending on the use thereof. In a PSA display element, dimethacrylate derivatives are particularly preferable.

Each of $Sp^1$ and $Sp^2$ independently represents a single bond, an alkylene group having 1 to 8 carbon atoms or —O—$(CH_2)_s$—, and in a PSA display element, at least one of $Sp^1$ and $Sp^2$ is preferably a single bond, and compounds in which the both represent a single bond, and an embodiment in which one of Sp¹ and Sp² represents a single bond, and the other represents an alkylene group having 1 to 8 carbon atoms or —O—(CH₂)ₛ— are preferable. In this case, the alkyl group having 1 to 4 is preferable, and s is preferably 1 to 4.

Z¹ is preferably —OCH₂—, —CH₂O—, —COO—, —OCO—, —CF₂O—, —OCF₂—, —CH₂CH₂—, or —CF₂CF₂— or a single bond, more preferably —COO—, —OCO— or a single bond, and particularly preferably a single bond.

B represents a 1,4-phenylene group, trans-1,4-cyclohexylene group or a single group in which arbitrary a hydrogen atom may be substituted with a fluorine atom, and a 1,4-phenylene group or a single group is preferable. In the case where C represents a ring structure other than a single bond, Z² is also preferably a linking group other than a single bond, and in the case where C is a single bond, Z¹ is preferably a single bond.

From these points of view, in General Formula (VI), ring structures between Sp¹ and Sp², specifically, the structures described below are preferable.

In General Formula (VI), C represents a single bond, in the case where the ring structure is formed of two rings, C preferably represents the following Formulas (VIa-1) to (VIa-5), more preferably represents Formulas (VIa-1) to (VIa-3), and particularly preferably represents Formula (VIa-1).

[Chem. 23]

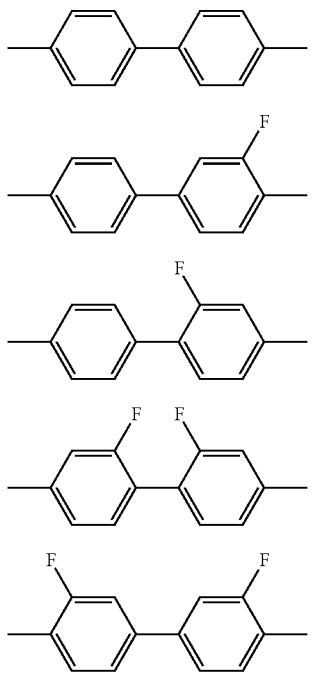

(In the formula, both the terminals are bonded to Sp¹ or Sp².)

In polymerizable compounds including these skeletons, since an alignment regulation force after polymerization is optimal to a PSA type liquid crystal display element, and an excellent alignment state is obtained, display unevenness is suppressed, or is not generated.

Based on what has been described above, as the polymerizable monomer, General Formulas (VI-1) to (VI-4) are particularly preferable, and among these, General Formula (V-2) is most preferable.

[Chem. 24]

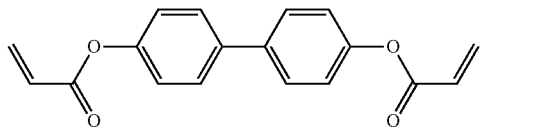

(VI-1)

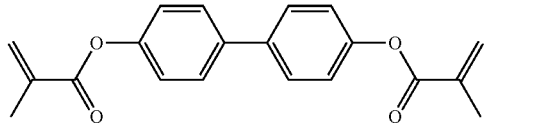

(VI-2)

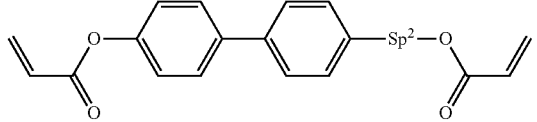

(VI-3)

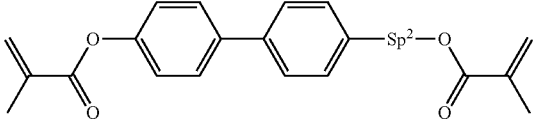

(VI-4)

(In the formula, Sp² represents an alkylene group having 2 to 5 carbon atoms.)

In the case of adding a monomer to the liquid crystal composition of the invention, polymerization proceeds even when the polymerization initiator is not present, however, the polymerization initiator may be contained in order to promote the polymerization. Examples of the polymerization initiator include benzoin ethers, benzophenones, acetophenones, benzyl ketals and acyl phosphine oxides. In addition, the stabilizer may be added in order to improve the storage stability. Examples of the stabilizer capable of being used include hydroquinones, hydroquinone monoalkyl ethers, tert-butyl catechols, pyrogallols, thiophenols, nitro compounds, β-naphthylamines, β-naphthols, nitroso compounds and the like.

The polymerizable-compound-containing liquid crystal composition of the present invention is useful for the liquid crystal display element, in particular, the liquid crystal display element for active matrix driving, and can be used in the liquid crystal display element for a PSA mode, a PSVA mode, a VA mode, an IPS mode or an ECB mode.

The polymerizable-compound-containing liquid crystal composition of the present invention has a liquid crystal alignment capability by polymerizing a polymerizable compound included therein using ultraviolet ray irradiation, and is used in the liquid crystal display element which controls the light transmission amount using birefringence of the liquid crystal composition. It is useful for the liquid crystal display element such as an AM-LCD (active matrix liquid crystal display element), a TN (nematic liquid crystal display element), an STN-LCD (super twisted nematic liquid crystal display element), an OCB-LCD and an IPS-LCD (in-plane switching liquid crystal display element), it is particularly useful for the AM-LCD, and it can be used for transmissive or reflective liquid crystal display element.

As two substrates of the liquid crystal cell used in the liquid crystal display element, a transparent material having flexibility as glass or plastic can be used, and the one substrate may be an opaque material such as silicon. For example, a transparent substrate having a transparent electrode layer can be obtained by sputtering indium-tin oxide (ITO) onto a transparent substrate such as a glass plate.

The above-described substrate is disposed such that the transparent electrode layer becomes the inner side. At that time, the space between substrates may be adjusted through a spacer. At this time, the space is preferably adjusted such that the thickness of a light adjusting layer is in the range of 1 μm to 100 μm. The thickness is still more preferably in the range of 1.5 μm to 10 μm, and in the case where a polarizer is used, the product of the refractive index anisotropy Δn of liquid crystal and cell thickness d is preferably adjusted such that the contrast is maximum. Moreover, in the case where there are two polarizers, a polarization axis of each polarizer can be adjusted such that a viewing angle and a contrast are excellent. In addition, a phase difference film for widening the viewing angle can be also used. Examples of the spacer include glass particles, plastic particles, alumina particles, photoresist material and the like. Thereafter, a sealing agent such as an epoxy-based thermosetting composition is screen-printed onto the substrate in the form provided with the liquid crystal injection port, and the substrates are bonded to each other and are heated, whereby the sealing agent is heat-cured.

As a method which sandwiches the polymerizable-compound-containing liquid crystal composition between two substrates, a normal vacuum injection method or an ODF method can be used. In the vacuum injection method, the dropping mark is unlikely to be generated, and there is a problem that injection mark is remained. In the present invention, the display element which is prepared using the ODF method can be suitably used.

As a method for polymerizing polymerizable compounds, since an appropriate polymerization rate is desirable in order to obtain an excellent alignment capability of a liquid crystal, and a method in which polymerization is performed by irradiating active energy rays such as ultraviolet rays or electron beams singly or sequentially or in combination thereof is preferable. In the case where ultraviolet rays are used, a polarized light source may be used, and a non-polarized light source may be used. In addition, in the case where polymerization is performed in a state where the polymerizable-compound-containing liquid crystal composition is sandwiched between two substrates, appropriate transparency with respect to active energy rays is necessarily applied to at least the substrate of the irradiation surface side. In addition, a method in which after polymerizing only a specific portion using a mask during light irradiation, the alignment state of the unpolymerized portion is changed by changing conditions such as an electric field, a magnetic field or temperature, and further active energy rays are irradiated to polymerize may be used. In particular, when ultraviolet ray exposure is performed, ultraviolet ray exposure is preferably performed while applying an AC electric field to the polymerizable-compound-containing liquid crystal composition. The AC electric field to be applied is preferably an alternating current having a frequency in the range of 10 Hz to 10 kHz, more preferably in the range of 60 Hz to 10 kHz, and voltage is selected according to a desired pretilt angle of the liquid crystal display element. In other words, the pretilt angle of the liquid crystal display element can be controlled by an applied voltage. In the liquid crystal display element of a MVA mode, the pretilt angle is preferably controlled to be in the range of 80° to 89.9° from the viewpoint of alignment stability and contrast.

The temperature at the time of the irradiation is preferably in a temperature range in which a liquid crystal state of the liquid crystal composition of the present invention is maintained. The polymerization is preferably performed at a temperature around room temperature, that is, typically, at a temperature in the range of 15° C. to 35° C. As a lamp for generating ultraviolet rays, a metal halide lamp, a high pressure mercury lamp, and an ultrahigh pressure mercury lamp can be used. In addition, as the wavelength of ultraviolet rays to be irradiated, ultraviolet rays in a wavelength range which is not an absorption wavelength range of the liquid crystal composition is preferably irradiated, and if necessary, ultraviolet rays are preferably cut to use. The intensity of ultraviolet rays irradiated is preferably in the range of 0.1 mW/cm$^2$ to 100 W/cm$^2$, and more preferably in the range of 2 mW/cm$^2$ to 50 W/cm$^2$. The amount of energy of ultraviolet rays irradiated can be appropriately adjusted, and is preferably in the range of 10 mJ/cm$^2$ to 500 J/cm$^2$, and more preferably in the range of 100 mJ/cm$^2$ to 200 J/cm$^2$. When ultraviolet rays are irradiated, the intensity may be changed. The irradiation time of ultraviolet rays is appropriately selected according to the intensity of ultraviolet rays irradiated, and is preferably in the range of 10 seconds to 3,600 seconds, and more preferably in the range of 10 seconds to 600 seconds.

The present invention provides the liquid crystal display element which is configured to have a first substrate provided with a common electrode made of a transparent conductive material as described in FIG. 1, a second substrate provided with a thin film transistor which controls the pixel electrode provided in the pixel electrode made of a transparent conductive material and each pixel, and a liquid crystal composition which is sandwiched between the first substrate and the second substrate, and in which when a voltage is not applied, the alignment of liquid crystal molecules in the liquid crystal composition is substantially perpendicular with respect to the substrate, and the liquid crystal composition of the present invention is used as the liquid crystal composition.

The generation of the dropping mark is significantly influenced by the liquid crystal material which is injected, and is also inevitably influenced by the structure of the display element. In particular, a color filter and a thin film transistor formed in the liquid crystal element influences the generation of the dropping mark by the combination not having a member which separates the liquid crystal compositions other than the thin alignment film and the transparent electrode.

In particular, in the case where the thin film transistor is an inversely-staggered type, since a drain electrode is formed so as to cover a gate electrode, the area thereof tends to be increased. The drain electrode is formed of metal materials such as copper, aluminum, chromium, titanium, molybdenum and tantalum, and generally, a normal passivation process is performed thereto. However, since the protective layer is generally thin, the alignment film is also thin, and thus the possibility that the ionic materials are not blocked is high, it was impossible to avoid the generation of the dropping mark due to the interaction between a metal material and the liquid crystal composition.

Figure 2:
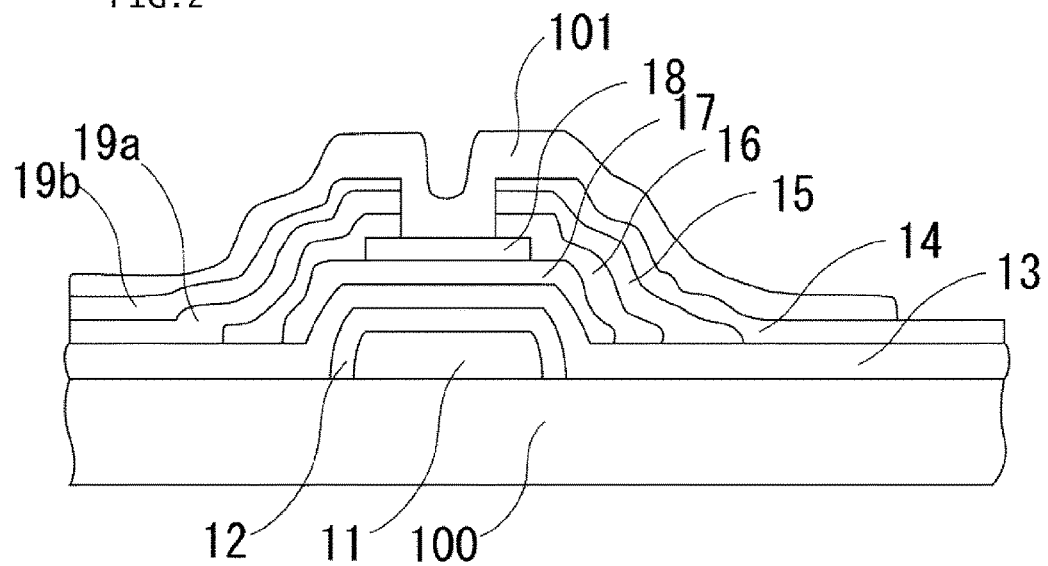
FIG. 2 is a configuration example of an inversely-staggered thin film transistor.

In the present invention, a thin film transistor as described in FIG. 2 can be suitably used in the liquid crystal display element which is an inversely-staggered type, and it is preferably used in the case of using an aluminum wire.

The liquid crystal display element using the liquid crystal composition of the present invention is useful one which satisfies both high speed response and suppression of display defect, and in particular, is useful for the liquid crystal display element for active matrix driving, and can be used for a VA mode, a PSVA mode, a PSA mode, an IPS mode or an ECB mode.

EXAMPLES

Hereinafter, the present invention will be described in more detail with examples, however, the present invention is not limited to the examples. In addition, "%" in the compositions of the following Examples and Comparative Examples means "% by mass".

In Examples, the measured characteristics are as follows.
$T_{ni}$: A nematic phase-isotropic liquid phase transition temperature (° C.)
Δn: Refractive index anisotropy at 25° C.
Δ∈: Dielectric anisotropy at 25° C.
η: Viscosity (mPa·s) at 20° C.
$γ_1$: Rotational viscosity (mPa·s) at 25° C.
VHR: Voltage holding ratio (%) at 60° C. under the conditions of a frequency of 60 Hz and an applying voltage of 1 V.
Burn-in: After displaying a predetermined fixed pattern in the display area for 1,000 hours, by visually inspecting the afterimage level of the fixed pattern at the time when the full screen was uniformly displayed, the evaluation of the burn-in on a liquid crystal display element was performed on a scale of four stages described below.
A: Afterimage was not observed.
B: Afterimage was extremely slightly observed, however it was an acceptable level.
C: Afterimage was observed, and it was an unacceptable level.
D: Afterimage was observed, and it was a very poor level.
Dropping mark: by visually inspecting the dropping mark which whitely comes up to the surface in the case where the entire surface was displayed in black, the evaluation of the dropping mark on a liquid crystal display device was performed on a scale of four stages described below.
A: Afterimage was not observed.
B: Afterimage was extremely slightly observed, however it was an acceptable level.
C: Afterimage was observed, and it was an unacceptable level.
D: Afterimage was observed, and it was a very poor level.
Process compatibility: in ODF process, dropping the liquid crystal by 50 pL was performed 100,000 times using a constant volume metering pump, the change in amount of liquid crystal dropped by every 100 times of the following "0 to 100 times, 101 to 200 times, 201 to 300 times, . . . , 99, 901 to 100,000 times" was evaluated on a scale of four stages described below.
A: Change was extremely small (liquid crystal display element can be stably prepared.)
B: Change was slightly observed, however it was an acceptable level.
C: Change was observed, and it was an unacceptable level (yield was deteriorated by generation of spots).
D: Change was observed, and it was a very poor level (liquid crystal leakage or vacuum bubbles are generated).
Solubility at low temperatures: After preparing a liquid crystal composition, 1 g of the liquid crystal composition was weighed and placed in a sample bottle of 2 mL, the temperature change having one cycle, that is, "−20° C. (maintained for 1 hour)→heating (0.1° C./min)→0° C. (maintained for 1 hour)→heating (0.1° C./min)→20° C. (maintained for 1 hour)→cooling (−0.1° C./min)→0° C. (maintained for 1 hour)→cooling (−0.1° C./min)→−20° C." was continuously given thereto in a temperature controllable test chamber, the generation of precipitates from the liquid crystal composition was visually observed, and the evaluation was performed on a scale of four stages described below.

A: Precipitate was not observed for equal to or longer than 600 hours.
B: Precipitates was not observed for equal to or longer than 300 hours.
C: Precipitates was observed within equal to or shorter than 150 hours.
D: Precipitates was observed within equal to or shorter than 75 hours.

Moreover, in the examples, the following abbreviations were used for describing the compounds.

(Side Chain)
n —$C_nH_{2n+1}$ a straight-chain alkyl group having n carbon atoms
On —$OC_nH_{2n+1}$ a straight-chain alkoxy group having n carbon atoms
V —C=$CH_2$ a vinyl group (Ring Structure)

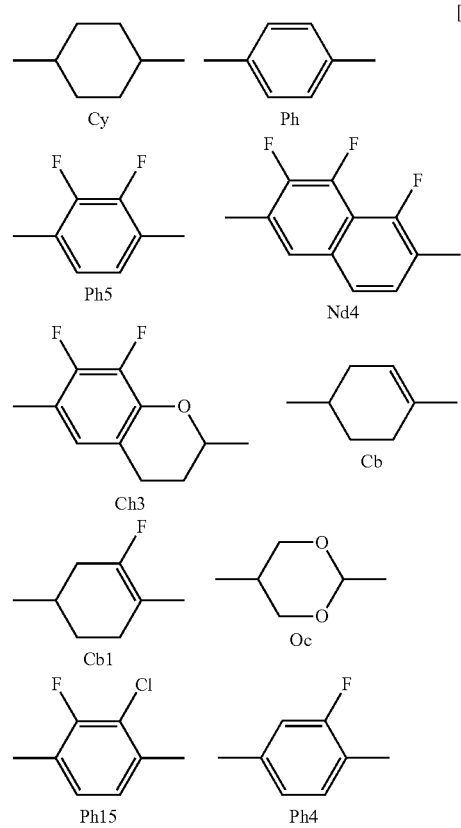

[Chem. 25]

Example 1

The liquid crystal composition having the constitution described below was prepared, and the physical properties thereof were measured. The results are shown in the following Table.

Using the liquid crystal composition of Example 1, the VA liquid crystal display element shown in FIG. 1 was prepared. This liquid crystal display element has an inversely-staggered thin film transistor as an active element. Injection of the liquid crystal composition was performed by the dropping method, and the burn-in, the dropping mark, the process compatibility and the solubility at low temperature were evaluated.

Moreover, symbols on the left side of the content represent the abbreviations of the above-described compounds.

[Chem. 26]

Example 1

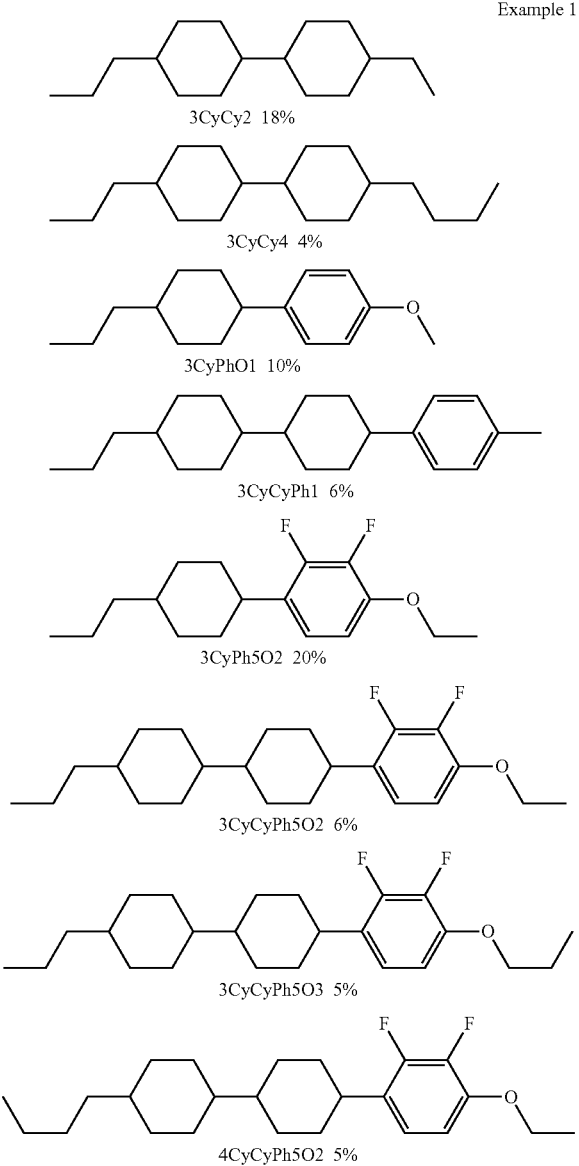

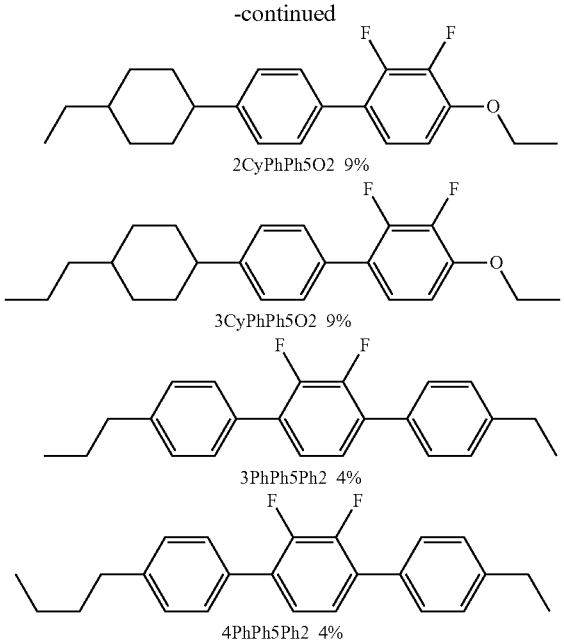

TABLE 1

| | |
|---|---|
| $T_{NI}/°C$ | 76.5 |
| $\Delta n$ | 0.107 |
| $n_o$ | 1.486 |
| $\Delta \epsilon$ | −3.3 |
| $\epsilon_\perp$ | 7.1 |
| $\eta/mPa \cdot s$ | 22.8 |
| $\gamma_1/mPa \cdot s$ | 149 |
| $\gamma_1/\Delta n^2 \times 10^{-3}$ | 13.0 |
| Initial voltage holding ratio/% | 99.8 |
| Voltage holding ratio after 1 hour at 150° C./% | 99.2 |
| Evaluation of burn-in | A |
| Evaluation of dropping mark | A |
| Evaluation of process compatibility | A |
| Evaluation of solubility at low temperatures | A |

It is understood that the liquid crystal composition of Example 1 has a liquid crystal layer temperature range of 76.5° C. which is practical as a liquid crystal composition for a TV, a great absolute value of the dielectric anisotropy, and a low viscosity and an optimal Δn. Using the liquid crystal composition of Example 1, the VA liquid crystal display element shown in FIG. 1 was prepared, and when the burn-in, the dropping mark, the process compatibility and the solubility at low temperature were evaluated in the same manner described above, the evaluation results were extremely excellent.

Examples 2 and 3

The liquid crystal composition having the composition described below was prepared, and the physical properties thereof were measured. The results are shown in the following Table.

Using the liquid crystal composition of Examples 2 and 3, a VA liquid crystal display element was prepared in the same manner as in Example 1, and the burn-in, the dropping mark, the process compatibility and the solubility at low temperature were evaluated, and the results are shown in the same Table.

TABLE 2

Example 2

| | |
|---|---|
| 3CyCy2 | 20% |
| 3CyCy4 | 7% |
| 3CyPhO1 | 12% |
| 3CyPh5O2 | 15% |
| 3CyCyPh5O2 | 4% |
| 3CyCyPh5O3 | 4% |
| 4CyCyPh5O2 | 4% |
| 2CyPhPh5O2 | 14% |
| 3CyPhPh5O2 | 14% |
| 3PhPh5Ph2 | 3% |
| 4PhPh5Ph2 | 3% |
| $T_{NI}$/° C. | 76.5 |
| Δn | 0.108 |
| $n_o$ | 1.486 |
| Δε | −3.2 |
| $ε_⊥$ | 7.0 |
| η/mPa·s | 22.7 |
| $γ_1$/mPa·s | 157 |
| $γ_1/Δn^2 × 10^{-3}$ | 13.5 |
| Initial voltage holding ratio/% | 99.7 |
| Voltage holding ratio after 1 hour at 150° C./% | 99.0 |
| Evaluation of burn-in | A |
| Evaluation of dropping mark | A |
| Evaluation of process compatibility | A |
| Evaluation of solubility at low temperatures | B |

Example 3

| | |
|---|---|
| 3CyCy2 | 21% |
| 3CyCyPh1 | 12% |
| 3CyPhPh3 | 6% |
| 3CyPh5O2 | 17% |
| 3CyPh5O4 | 7% |
| 5CyPh5O2 | 5% |
| 3CyCyPh5O2 | 4% |
| 3CyCyPh5O3 | 3% |
| 4CyCyPh5O2 | 3% |
| 2CyPhPh5O2 | 5% |
| 3CyPhPh5O2 | 5% |
| 3PhPh5Ph2 | 6% |
| 4PhPh5Ph2 | 6% |
| $T_{NI}$/° C. | 75.6 |
| Δn | 0.108 |
| $n_o$ | 1.485 |
| Δε | −3.3 |
| $ε_⊥$ | 6.9 |
| η/mPa·s | 20.7 |
| $γ_1$/mPa·s | 135 |
| $γ_1/Δn^2 × 10^{-3}$ | 11.6 |
| Initial voltage holding ratio/% | 99.8 |
| Voltage holding ratio after 1 hour at 150° C./% | 99.0 |
| Evaluation of burn-in | A |
| Evaluation of dropping mark | A |
| Evaluation of process compatibility | A |
| Evaluation of solubility at low temperatures | A |

It is understood that the liquid crystal composition of Examples 2 and 3 has a liquid crystal layer temperature range which is practical as a liquid crystal composition for a TV, a great absolute value of the dielectric anisotropy, and a low viscosity and an optimal Δn. Using the liquid crystal composition of Examples 2 and 3, the VA liquid crystal display element shown in FIG. 1 was prepared, and when the burn-in, the dropping mark, the process compatibility and the solubility at low temperature were evaluated in the same manner described above, the evaluation results were excellent.

Comparative Example 1

The liquid crystal composition described below which does not contain the compound represented by Formula (I) was prepared, and the physical properties thereof were measured. The results are shown in the following Table.

Moreover, in the same manner as in Example 1, symbols on the left side of the content represent the abbreviations of the compounds.

[Chem. 27]

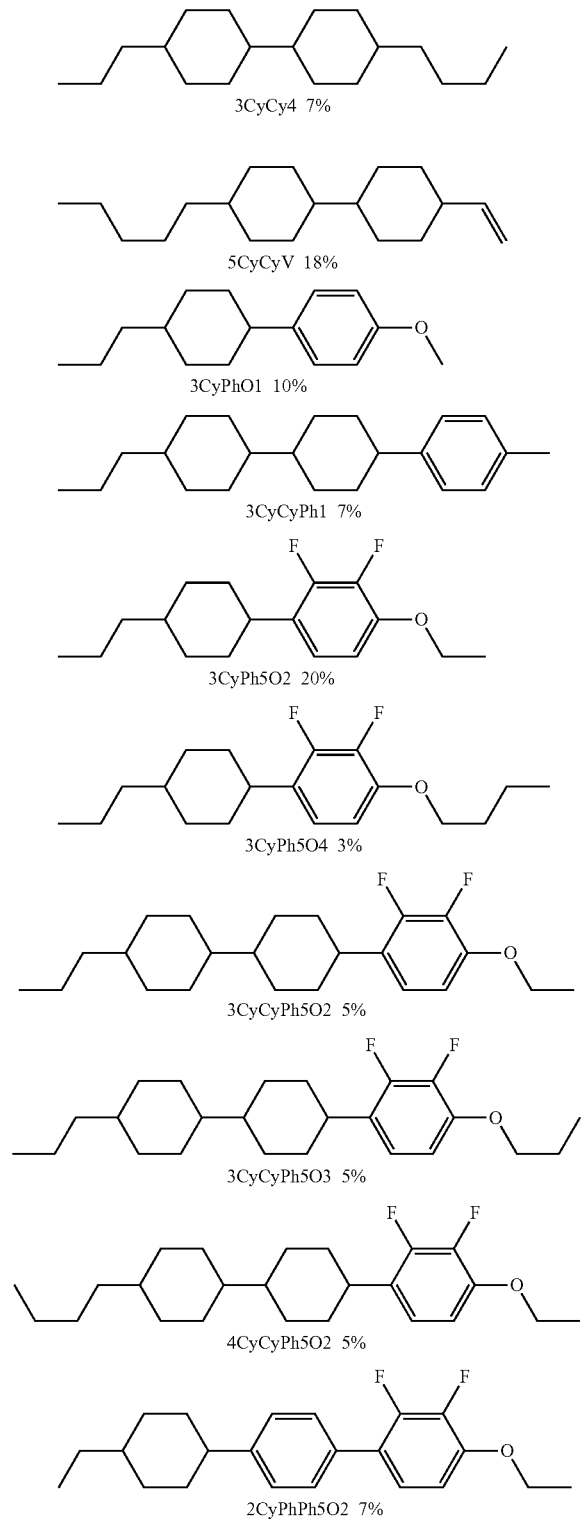

Comparative Example 1

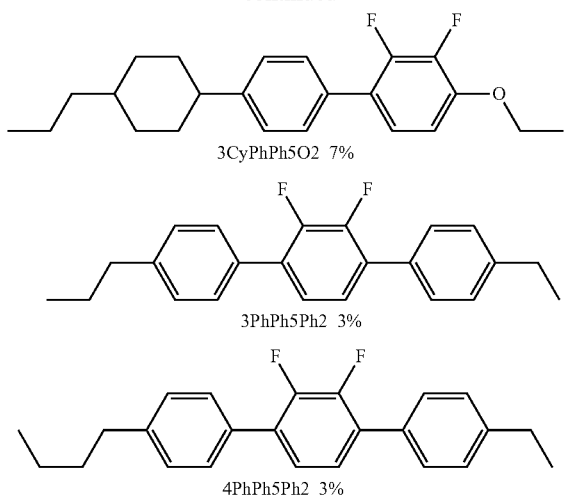

3CyPhPh5O2 7%

3PhPh5Ph2 3%

4PhPh5Ph2 3%

TABLE 2

| | |
|---|---|
| $T_{NI}/°C$ | 75.6 |
| $\Delta n$ | 0.106 |
| $n_o$ | 1.484 |
| $\Delta\epsilon$ | −3.3 |
| $\epsilon_\perp$ | 7.0 |
| $\eta$/mPa·s | 24.3 |
| $\gamma_1$/mPa·s | 154 |
| $\gamma_1/\Delta n^2 \times 10^{-3}$ | 13.7 |
| Initial voltage holding ratio/% | 98.7 |
| Voltage holding ratio after 1 hour at 150° C./% | 97.6 |
| Evaluation of burn-in | D |
| Evaluation of dropping mark | D |
| Evaluation of process compatibility | C |
| Evaluation of solubility at low temperatures | C |

It was found that the liquid crystal composition (Comparative Example 1) which does not contain the compound represented by Formula (I) has a higher viscosity η compared to the liquid crystal compositions (Examples 1 to 3) which contain the compound represented by Formula (I). For $\gamma_1$, 154 mPa·s which is a value of Comparative Example 1 is a lower value compared to 157 mPa·s which is a value of Example 2, however it was inferior when compared to the value of the parameter $\gamma_1/\Delta n^2$ which represents an effective response speed in the liquid crystal display element and the display. While the initial VHR of Comparative Example 1 was 98.7%, VHR value after being left at a high temperature of 150° C. for 1 hour was 97.6%. When the process compatibility was evaluated, a level in which change is unacceptable was obtained compared to Examples 1 to 3. When the solubility at a low temperature was evaluated, the precipitation was observed early compared to Examples 1 to 3.

Comparative Example 2

The liquid crystal composition described below which contains the compound represented by Formula (II) of only 12% was prepared, and the physical properties thereof were measured. The results are shown in the following Table.

TABLE 1

| Comparative Example 2 | |
|---|---|
| 3CyCy2 | 18% |
| 3CyPhO1 | 8% |
| 5PhPh1 | 10% |
| 3CyPh5O2 | 6% |
| 3CyPh5O4 | 6% |
| 3CyCyPh5O2 | 10% |
| 3CyCyPh5O3 | 10% |
| 4CyCyPh5O2 | 10% |
| 2CyPhPh5O2 | 8% |
| 3CyPhPh5O2 | 8% |
| 3PhPh5Ph2 | 3% |
| 4PhPh5Ph2 | 3% |
| $T_{NI}/°C$ | 79.0 |
| $\Delta n$ | 0.112 |
| $n_o$ | 1.489 |
| $\Delta\epsilon$ | −3.2 |
| $\epsilon_\perp$ | 6.9 |
| $\eta$/mPa·s | 29.4 |
| $\gamma_1$/mPa·s | 207 |
| $\gamma_1/\Delta n^2 \times 10^{-3}$ | 16.5 |
| Initial voltage holding ratio/% | 99.0 |
| Voltage holding ratio after 1 hour at 150° C./% | 98.2 |
| Evaluation of burn-in | C |
| Evaluation of dropping mark | C |
| Evaluation of process compatibility | C |
| Evaluation of solubility at low temperatures | B |

It was found that the liquid crystal composition (Comparative Example 2) which contains the compound represented by General Formula (II) of only 12% has a higher viscosity η and rotational viscosity $\gamma_1$ compared to the liquid crystal compositions (Comparative Examples 1 to 3) which contain the compound represented by General Formula (II) of equal to or more than 15%. While the initial VHR of Comparative Example 2 was 99.0%, VHR value after being left at a high temperature of 150° C. for 1 hour was 98.2%. When the process compatibility was evaluated, a level in which change is unacceptable was obtained compared to Examples 1 to 3. When the solubility at a low temperature was evaluated, the precipitation was observed early compared to Examples 1 to 3.

Examples 4 and 5

The liquid crystal composition having the composition described below was prepared, and the physical properties thereof were measured. The results are shown in the following Table.

Using the liquid crystal composition of Examples 4 and 5, a VA liquid crystal display element was prepared in the same manner as in Example 1, and the burn-in, the dropping mark, the process compatibility and the solubility at low temperature were evaluated, and the results are shown in the same Table.

TABLE 1

| Example 4 | |
|---|---|
| 3CyCy2 | 18% |
| 3CyCy4 | 4% |
| 3CyPhO1 | 8% |
| 3CyCyPh1 | 6% |
| 3CyPh5O2 | 17% |
| 3CyPh5O4 | 3% |
| 3CyCyPh5O2 | 4% |
| 3CyCyPh5O3 | 4% |
| 4CyCyPh5O2 | 4% |
| 2CyPhPh5O2 | 9% |
| 3CyPhPh5O2 | 9% |

TABLE 1-continued

| | |
|---|---|
| 3PhPh5Ph2 | 7% |
| 4PhPh5Ph2 | 7% |
| $T_{NI}/°\ C.$ | 76.1 |
| $\Delta n$ | 0.116 |
| $n_o$ | 1.488 |
| $\Delta \epsilon$ | -3.2 |
| $\epsilon_\perp$ | 7.0 |
| $\eta/mPa \cdot s$ | 23.3 |
| $\gamma_1/mPa \cdot s$ | 160 |
| $\gamma_1/\Delta n^2 \times 10^{-3}$ | 11.9 |
| Initial voltage holding ratio/% | 99.7 |
| Voltage holding ratio after 1 hour at 150° C./% | 98.9 |
| Evaluation of burn-in | B |
| Evaluation of dropping mark | A |
| Evaluation of process compatibility | B |
| Evaluation of solubility at low temperatures | A |
| Example 5 | |
| 3CyCy2 | 20% |
| 3CyCy4 | 6% |
| 3CyPhO1 | 9% |
| 3CyCyPh1 | 5% |
| 3CyPh5O2 | 18% |
| 3CyPh5O4 | 3% |
| 3CyCyPh5O2 | 8% |
| 3CyCyPh5O3 | 8% |
| 4CyCyPh5O2 | 8% |
| 2CyPhPh5O2 | 5% |
| 3CyPhPh5O2 | 5% |
| 3PhPh5Ph2 | 5% |
| $T_{NI}/°\ C.$ | 74.8 |
| $\Delta n$ | 0.094 |
| $n_o$ | 1.482 |
| $\Delta \epsilon$ | -3.2 |
| $\epsilon_\perp$ | 6.9 |
| $\eta/mPa \cdot s$ | 21.0 |
| $\gamma_1/mPa \cdot s$ | 134 |
| $\gamma_1/\Delta n^2 \times 10^{-3}$ | 15.2 |
| Initial voltage holding ratio/% | 99.6 |
| Voltage holding ratio after 1 hour at 150° C./% | 98.8 |
| Evaluation of burn-in | A |
| Evaluation of dropping mark | A |
| Evaluation of process compatibility | A |
| Evaluation of solubility at low temperatures | B |

It is understood that the liquid crystal composition of Examples 4 and 5 has a liquid crystal layer temperature range which is practical as a liquid crystal composition for a TV, a great absolute value of the dielectric anisotropy, and a low viscosity and an optimal Δn. Using the liquid crystal composition of Examples 4 and 5, the VA liquid crystal display element shown in FIG. 1 was prepared, and when the burn-in, the dropping mark, the process compatibility and the solubility at low temperature were evaluated in the same manner described above, the evaluation results were excellent.

Examples 6 and 7

The liquid crystal composition having the composition described below was prepared, and the physical properties thereof were measured. The results are shown in the following Table.

Using the liquid crystal composition of Examples 6 and 7, a VA liquid crystal display element was prepared in the same manner as in Example 1, and the burn-in, the dropping mark, the process compatibility and the solubility at low temperature were evaluated, and the results are shown in the same Table.

TABLE 1

| Example 6 | |
|---|---|
| 3CyCy2 | 18% |
| 3CyCy4 | 5% |
| 3CyPhO1 | 9% |
| 3CyPh5O2 | 21% |
| 3CyCyPh5O2 | 7% |
| 3CyCyPh5O3 | 7% |
| 4CyCyPh5O2 | 7% |
| 2CyPhPh5O2 | 9% |
| 3CyPhPh5O2 | 9% |
| 3PhPh5Ph2 | 4% |
| 4PhPh5Ph2 | 4% |
| $T_{NI}/°\ C.$ | 75.3 |
| $\Delta n$ | 0.106 |
| $n_o$ | 1.485 |
| $\Delta \epsilon$ | -3.8 |
| $\epsilon_\perp$ | 7.8 |
| $\eta/mPa \cdot s$ | 25.0 |
| $\gamma_1/mPa \cdot s$ | 160 |
| $\gamma_1/\Delta n^2 \times 10^{-3}$ | 14.2 |
| Initial voltage holding ratio/% | 99.4 |
| Voltage holding ratio after 1 hour at 150° C./% | 98.8 |
| Evaluation of burn-in | B |
| Evaluation of dropping mark | B |
| Evaluation of process compatibility | A |
| Evaluation of solubility at low temperatures | A |
| Example 7 | |
| 3CyCy2 | 20% |
| 3CyCy4 | 9% |
| 3CyPhO1 | 9% |
| 3CyCyPh1 | 5% |
| 3CyPh5O2 | 16% |
| 3CyCyPh5O2 | 5% |
| 3CyCyPh5O3 | 4% |
| 4CyCyPh5O2 | 4% |
| 2CyPhPh5O2 | 8% |
| 3CyPhPh5O2 | 8% |
| 3PhPh5Ph2 | 6% |
| 4PhPh5Ph2 | 6% |
| $T_{NI}/°\ C.$ | 75.8 |
| $\Delta n$ | 0.106 |
| $n_o$ | 1.486 |
| $\Delta \epsilon$ | -2.7 |
| $\epsilon_\perp$ | 6.2 |
| $\eta/mPa \cdot s$ | 19.7 |
| $\gamma_1/mPa \cdot s$ | 138 |
| $\gamma_1/\Delta n^2 \times 10^{-3}$ | 12.3 |
| Initial voltage holding ratio/% | 99.6 |
| Voltage holding ratio after 1 hour at 150° C./% | 99.0 |
| Evaluation of burn-in | A |
| Evaluation of dropping mark | A |
| Evaluation of process compatibility | A |
| Evaluation of solubility at low temperatures | B |

It is understood that the liquid crystal composition of Examples 6 and 7 has a liquid crystal layer temperature range which is practical as a liquid crystal composition for a TV, a great absolute value of the dielectric anisotropy, and a low viscosity and an optimal Δn. Using the liquid crystal composition of Examples 6 and 7, the VA liquid crystal display element shown in FIG. 1 was prepared, and when the burn-in, the dropping mark, the process compatibility and the solubility at low temperature were evaluated in the same manner described above, the evaluation results were excellent.

Examples 8 and 9

The liquid crystal composition having the composition described below was prepared, and the physical properties thereof were measured. The results are shown in the following Table.

Using the liquid crystal composition of Examples 6 and 7, a VA liquid crystal display element was prepared in the same manner as in Example 1, and the burn-in, the dropping mark, the process compatibility and the solubility at low temperature were evaluated, and the results are shown in the same Table.

TABLE 1

| Example 8 | |
|---|---|
| 3CyCy2 | 20% |
| 3CyCy4 | 5% |
| 3CyPhO1 | 10% |
| 3CyCyPh1 | 6% |
| 3CyPh5O2 | 16% |
| 3CyCyPh5O2 | 3% |
| 3CyCyPh5O3 | 3% |
| 4CyCyPh5O2 | 3% |
| 2CyPhPh5O2 | 9% |
| 3CyPhPh5O2 | 9% |
| 3PhPh5Ph2 | 8% |
| 4PhPh5Ph2 | 8% |
| $T_{NI}/°\ C.$ | 75.3 |
| $\Delta n$ | 0.116 |
| $n_o$ | 1.489 |
| $\Delta\epsilon$ | −2.7 |
| $\epsilon_\perp$ | 6.2 |
| $\eta$/mPa · s | 20.8 |
| $\gamma_1$/mPa · s | 150 |
| $\gamma_1/\Delta n^2 \times 10^{-3}$ | 11.1 |
| Initial voltage holding ratio/% | 99.5 |
| Voltage holding ratio after 1 hour at 150° C./% | 99.1 |
| Evaluation of burn-in | A |
| Evaluation of dropping mark | B |
| Evaluation of process compatibility | B |
| Evaluation of solubility at low temperatures | A |
| Example 9 | |
| 3CyCy2 | 25% |
| 3CyCy4 | 10% |
| 3CyCy5 | 5% |
| 3CyCyPh1 | 2% |
| 3CyPh5O2 | 15% |
| 3CyPh5O4 | 3% |
| 3CyCyPh5O2 | 7% |
| 3CyCyPh5O3 | 6% |
| 4CyCyPh5O2 | 6% |
| 2CyPhPh5O2 | 5% |
| 3CyPhPh5O2 | 4% |
| 3PhPh5Ph2 | 6% |
| 4PhPh5Ph2 | 6% |
| $T_{NI}/°\ C.$ | 75.6 |
| $\Delta n$ | 0.095 |
| $n_o$ | 1.481 |
| $\Delta\epsilon$ | −2.7 |
| $\epsilon_\perp$ | 6.1 |
| $\eta$/mPa · s | 18.2 |
| $\gamma_1$/mPa · s | 122 |
| $\gamma_1/\Delta n^2 \times 10^{-3}$ | 13.5 |
| Initial voltage holding ratio/% | 99.8 |
| Voltage holding ratio after 1 hour at 150° C./% | 99.3 |
| Evaluation of burn-in | A |
| Evaluation of dropping mark | A |
| Evaluation of process compatibility | B |
| Evaluation of solubility at low temperatures | B |

It is understood that the liquid crystal composition of Examples 8 and 9 has a liquid crystal layer temperature range which is practical as a liquid crystal composition for a TV, a great absolute value of the dielectric anisotropy, and a low viscosity and an optimal Δn. Using the liquid crystal composition of Examples 8 and 9, the VA liquid crystal display element shown in FIG. 1 was prepared, and when the burn-in, the dropping mark, the process compatibility and the solubility at low temperature were evaluated in the same manner described above, the evaluation results were excellent.

Examples 10 and 11

The liquid crystal composition having the composition described below was prepared, and the physical properties thereof were measured. The results are shown in the following Table.

Using the liquid crystal composition of Examples 10 and 11, a VA liquid crystal display element was prepared in the same manner as in Example 1, and the burn-in, the dropping mark, the process compatibility and the solubility at low temperature were evaluated, and the results are shown in the same Table.

TABLE 1

| Example 10 | |
|---|---|
| 3CyCy2 | 20% |
| 3CyCy4 | 4% |
| 3CyPhO1 | 5% |
| 3CyCyPh1 | 2% |
| 3CyPh5O2 | 21% |
| 3CyCyPh5O2 | 5% |
| 3CyCyPh5O3 | 4% |
| 4CyCyPh5O2 | 4% |
| 2CyPhPh5O2 | 11% |
| 3CyPhPh5O2 | 11% |
| 3PhPh5Ph2 | 7% |
| 4PhPh5Ph2 | 6% |
| $T_{NI}/°\ C.$ | 76.6 |
| $\Delta n$ | 0.116 |
| $n_o$ | 1.487 |
| $\Delta\epsilon$ | −3.7 |
| $\epsilon_\perp$ | 7.7 |
| $\eta$/mPa · s | 24.6 |
| $\gamma_1$/mPa · s | 163 |
| $\gamma_1/\Delta n^2 \times 10^{-3}$ | 12.1 |
| Initial voltage holding ratio/% | 99.7 |
| Voltage holding ratio after 1 hour at 150° C./% | 99.1 |
| Evaluation of burn-in | B |
| Evaluation of dropping mark | A |
| Evaluation of process compatibility | B |
| Evaluation of solubility at low temperatures | A |
| Example 11 | |
| 3CyCy2 | 20% |
| 3CyCy4 | 7% |
| 3CyCyPh1 | 9% |
| 3CyPh5O2 | 20% |
| 3CyPh5O4 | 5% |
| 5CyPh5O2 | 3% |
| 3CyCyPh5O2 | 8% |
| 3CyCyPh5O3 | 7% |
| 4CyCyPh5O2 | 7% |
| 2CyPhPh5O2 | 4% |
| 3CyPhPh5O2 | 4% |
| 3PhPh5Ph2 | 3% |
| 4PhPh5Ph2 | 3% |
| $T_{NI}/°\ C.$ | 76.0 |
| $\Delta n$ | 0.094 |
| $n_o$ | 1.480 |
| $\Delta\epsilon$ | −3.7 |
| $\epsilon_\perp$ | 7.5 |
| $\eta$/mPa · s | 21.5 |
| $\gamma_1$/mPa · s | 129 |
| $\gamma_1/\Delta n^2 \times 10^{-3}$ | 14.6 |
| Initial voltage holding ratio/% | 99.6 |
| Voltage holding ratio after 1 hour at 150° C./% | 99.0 |
| Evaluation of burn-in | A |
| Evaluation of dropping mark | A |
| Evaluation of process compatibility | B |
| Evaluation of solubility at low temperatures | B |

It is understood that the liquid crystal composition of Examples 10 and 11 has a liquid crystal layer temperature range which is practical as a liquid crystal composition for a TV, a great absolute value of the dielectric anisotropy, and a low viscosity and an optimal Δn. Using the liquid crystal composition of Examples 10 and 11, the VA liquid crystal display element shown in FIG. 1 was prepared, and when the burn-in, the dropping mark, the process compatibility and the solubility at low temperature were evaluated in the same manner described above, the evaluation results were excellent.

Examples 12 and 13

The liquid crystal composition having the composition described below was prepared, and the physical properties thereof were measured. The results are shown in the following Table.

Using the liquid crystal composition of Examples 12 and 13, a VA liquid crystal display element was prepared in the same manner as in Example 1, and the burn-in, the dropping mark, the process compatibility and the solubility at low temperature were evaluated, and the results are shown in the same Table.

TABLE 1

| Example 12 | |
|---|---|
| 3CyCy2 | 25% |
| 3CyCy4 | 9% |
| 3CyCyPh1 | 10% |
| 3CyPh5O2 | 15% |
| 3CyCyPh5O2 | 9% |
| 3CyCyPh5O3 | 8% |
| 4CyCyPh5O2 | 8% |
| 2CyPhPh5O2 | 3% |
| 3CyPhPh5O2 | 3% |
| 3PhPh5Ph2 | 5% |
| 4PhPh5Ph2 | 5% |
| $T_{NI}/°C.$ | 87.2 |
| $\Delta n$ | 0.095 |
| $n_o$ | 1.482 |
| $\Delta\epsilon$ | −2.7 |
| $\epsilon_\perp$ | 6.0 |
| $\eta/mPa \cdot s$ | 19.5 |
| $\gamma_1/mPa \cdot s$ | 131 |
| $\gamma_1/\Delta n^2 \times 10^{-3}$ | 14.5 |
| Initial voltage holding ratio/% | 99.7 |
| Voltage holding ratio after 1 hour at 150° C./% | 99.2 |
| Evaluation of burn-in | A |
| Evaluation of dropping mark | A |
| Evaluation of process compatibility | B |
| Evaluation of solubility at low temperatures | B |
| Example 13 | |
| 3CyCy2 | 21% |
| 3CyCy4 | 10% |
| 3CyCyPh1 | 10% |
| 3CyPhPh3 | 4% |
| 3CyPh5O2 | 16% |
| 3CyCyPh5O2 | 5% |
| 3CyCyPh5O3 | 4% |
| 4CyCyPh5O2 | 4% |
| 2CyPhPh5O2 | 7% |
| 3CyPhPh5O2 | 7% |
| 3PhPh5Ph2 | 6% |
| 4PhPh5Ph2 | 6% |
| $T_{NI}/°C.$ | 87.8 |
| $\Delta n$ | 0.107 |
| $n_o$ | 1.485 |
| $\Delta\epsilon$ | −2.7 |
| $\epsilon_\perp$ | 6.0 |
| $\eta/mPa \cdot s$ | 19.8 |
| $\gamma_1/mPa \cdot s$ | 138 |
| $\gamma_1/\Delta n^2 \times 10^{-3}$ | 12.1 |

TABLE 1-continued

| Initial voltage holding ratio/% | 99.8 |
|---|---|
| Voltage holding ratio after 1 hour at 150° C./% | 99.3 |
| Evaluation of burn-in | A |
| Evaluation of dropping mark | A |
| Evaluation of process compatibility | A |
| Evaluation of solubility at low temperatures | A |

It is understood that the liquid crystal composition of Examples 12 and 13 has a liquid crystal layer temperature range which is practical as a liquid crystal composition for a TV, a great absolute value of the dielectric anisotropy, and a low viscosity and an optimal Δn. Using the liquid crystal composition of Examples 12 and 13, the VA liquid crystal display element shown in FIG. 1 was prepared, and when the burn-in, the dropping mark, the process compatibility and the solubility at low temperature were evaluated in the same manner described above, the evaluation results were excellent.

Example 14

The liquid crystal composition having the composition described below was prepared, and the physical properties thereof were measured. The results are shown in the following Table.

Using the liquid crystal composition of Example 14, a VA liquid crystal display element was prepared in the same manner as in Example 1, and the burn-in, the dropping mark, the process compatibility and the solubility at low temperature were evaluated, and the results are shown in the same Table.

TABLE 1

| Example 14 | |
|---|---|
| 3CyCy2 | 16% |
| 3CyPhO1 | 10% |
| 3CyCyPh1 | 10% |
| 3CyPhPh3 | 8% |
| 3CyPh5O2 | 16% |
| 3CyCyPh5O2 | 5% |
| 3CyCyPh5O3 | 5% |
| 4CyCyPh5O2 | 4% |
| 2CyPhPh5O2 | 7% |
| 3CyPhPh5O2 | 7% |
| 3PhPh5Ph2 | 7% |
| 4PhPh5Ph2 | 7% |
| $T_{NI}/°C.$ | 87.4 |
| $\Delta n$ | 0.117 |
| $n_o$ | 1.491 |
| $\Delta\epsilon$ | −2.7 |
| $\epsilon_\perp$ | 6.2 |
| $\eta/mPa \cdot s$ | 23.6 |
| $\gamma_1/mPa \cdot s$ | 171 |
| $\gamma_1/\Delta n^2 \times 10^{-3}$ | 12.5 |
| Initial voltage holding ratio/% | 99.6 |
| Voltage holding ratio after 1 hour at 150° C./% | 99.2 |
| Evaluation of burn-in | B |
| Evaluation of dropping mark | B |
| Evaluation of process compatibility | A |
| Evaluation of solubility at low temperatures | B |

It is understood that the liquid crystal composition of Example 14 has a liquid crystal layer temperature range which is practical as a liquid crystal composition for a TV, a great absolute value of the dielectric anisotropy, and a low viscosity and an optimal Δn. Using the liquid crystal composition of Example 14, the VA liquid crystal display element shown in FIG. 1 was prepared, and when the burn-in, the dropping mark, the process compatibility and the solubility at low temperature were evaluated in the same manner described above, the evaluation results were excellent.

Comparative Examples 3 and 4

TABLE 1

| Comparative Example 3 | |
|---|---|
| 5CyCyV | 33% |
| 3CyPhO1 | 4% |
| 3CyCyPh1 | 4% |
| 3CyPh5O2 | 16% |
| 3CyCyPh5O2 | 9% |
| 3CyCyPh5O3 | 9% |
| 4CyCyPh5O2 | 9% |
| 2CyPhPh5O2 | 5% |
| 3CyPhPh5O2 | 5% |
| 3PhPh5Ph2 | 3% |
| 4PhPh5Ph2 | 3% |
| $T_{NI}/°$ C. | 87.8 |
| $\Delta n$ | 0.106 |
| $n_o$ | 1.481 |
| $\Delta \epsilon$ | −3.3 |
| $\epsilon_\perp$ | 6.9 |
| $\eta$/mPa · s | 27.9 |
| $\gamma_1$/mPa · s | 183 |
| $\gamma_1/\Delta n^2 \times 10^{-3}$ | 16.3 |
| Initial voltage holding ratio/% | 98.9 |
| Voltage holding ratio after 1 hour at 150° C./% | 97.9 |
| Evaluation of burn-in | D |
| Evaluation of dropping mark | D |
| Evaluation of process compatibility | B |
| Evaluation of solubility at low temperatures | A |
| Comparative Example 4 | |
| 3CyCy2 | 25% |
| 3CyCy4 | 4% |
| 3CyPhO1 | 2% |
| 5PhPh1 | 6% |
| 3CyPh5O2 | 9% |
| 3CyCyPh5O2 | 10% |
| 3CyCyPh5O3 | 10% |
| 4CyCyPh5O2 | 10% |
| 2CyPhPh5O2 | 9% |
| 3CyPhPh5O2 | 9% |
| 3PhPh5Ph2 | 3% |
| 4PhPh5Ph2 | 9% |
| $T_{NI}/°$ C. | 88.2 |
| $\Delta n$ | 0.106 |
| $n_o$ | 1.485 |
| $\Delta \epsilon$ | −3.2 |
| $\epsilon_\perp$ | 6.7 |
| $\eta$/mPa · s | 26.3 |
| $\gamma_1$/mPa · s | 184 |
| $\gamma_1/\Delta n^2 \times 10^{-3}$ | 16.4 |
| Initial voltage holding ratio/% | 99.1 |
| Voltage holding ratio after 1 hour at 150° C./% | 98.0 |
| Evaluation of burn-in | C |
| Evaluation of dropping mark | C |
| Evaluation of process compatibility | C |
| Evaluation of solubility at low temperatures | D |

It was found that the liquid crystal composition (Comparative Example 3) which does not contain the compound represented by Formula (I) has a higher viscosity $\eta$ and rotational viscosity $\gamma_1$ compared to the liquid crystal compositions (Comparative Examples 12 to 14) which contain the compound represented by Formula (I). While the initial VHR of Comparative Example 3 was 98.9%, VHR value after being left at a high temperature of 150° C. for 1 hour was 97.9%. When the process compatibility was evaluated, a level in which change is unacceptable was obtained compared to Examples 12 to 14. When the solubility at a low temperature was evaluated, the precipitation was observed early compared to Examples 1 to 3.

It was found that the liquid crystal composition (Comparative Example 4) which contains the compound represented by General Formula (II) of only 9% has a higher viscosity $\eta$ and rotational viscosity $\gamma_1$ compared to the liquid crystal compositions (Comparative Examples 12 to 14) which contain the compound represented by General Formula (II) of equal to or more than 15%. While the initial VHR of Comparative Example 4 was 99.1%, VHR value after being left at a high temperature of 150° C. for 1 hour was 98.0%. When the process compatibility was evaluated, a level in which change is unacceptable was obtained compared to Examples 12 to 14. When the solubility at a low temperature was evaluated, the precipitation was observed early compared to Examples 1 to 3.

Examples 15 and 16

The liquid crystal composition having the composition described below was prepared, and the physical properties thereof were measured. The results are shown in the following Table.

Using the liquid crystal composition of Examples 15 and 16, a VA liquid crystal display element was prepared in the same manner as in Example 1, and the burn-in, the dropping mark, the process compatibility and the solubility at low temperature were evaluated, and the results are shown in the same Table.

TABLE 1

| Example 15 | |
|---|---|
| 3CyCy2 | 22% |
| 3CyCy4 | 5% |
| 3CyPhO1 | 6% |
| 3CyCyPh1 | 5% |
| 3CyPh5O2 | 15% |
| 3CyCyPh5O2 | 11% |
| 3CyCyPh5O3 | 11% |
| 4CyCyPh5O2 | 11% |
| 2CyPhPh5O2 | 4% |
| 3CyPhPh5O2 | 4% |
| 3PhPh5Ph2 | 3% |
| 4PhPh5Ph2 | 3% |
| $T_{NI}/°$ C. | 87.1 |
| $\Delta n$ | 0.095 |
| $n_o$ | 1.482 |
| $\Delta \epsilon$ | −3.3 |
| $\epsilon_\perp$ | 6.8 |
| $\eta$/mPa · s | 23.9 |
| $\gamma_1$/mPa · s | 157 |
| $\gamma_1/\Delta n^2 \times 10^{-3}$ | 17.4 |
| Initial voltage holding ratio/% | 99.5 |
| Voltage holding ratio after 1 hour at 150° C./% | 99.1 |
| Evaluation of burn-in | A |
| Evaluation of dropping mark | A |
| Evaluation of process compatibility | A |
| Evaluation of solubility at low temperatures | B |
| Example 16 | |
| 3CyCy2 | 18% |
| 3CyCy4 | 4% |
| 3CyPhO1 | 8% |
| 3CyCyPh1 | 9% |
| 3CyPh5O2 | 16% |
| 3CyCyPh5O2 | 7% |
| 3CyCyPh5O3 | 7% |
| 4CyCyPh5O2 | 7% |
| 2CyPhPh5O2 | 9% |
| 3CyPhPh5O2 | 9% |
| 3PhPh5Ph2 | 3% |
| 4PhPh5Ph2 | 3% |
| $T_{NI}/°$ C. | 87.5 |
| $\Delta n$ | 0.106 |
| $n_o$ | 1.486 |

TABLE 1-continued

| | |
|---|---|
| $\Delta\epsilon$ | −3.3 |
| $\epsilon_\perp$ | 7.0 |
| $\eta$/mPa·s | 24.9 |
| $\gamma_1$/mPa·s | 166 |
| $\gamma_1/\Delta n^2 \times 10^{-3}$ | 14.8 |
| Initial voltage holding ratio/% | 99.7 |
| Voltage holding ratio after 1 hour at 150° C./% | 99.2 |
| Evaluation of burn-in | A |
| Evaluation of dropping mark | B |
| Evaluation of process compatibility | A |
| Evaluation of solubility at low temperatures | B |

It is understood that the liquid crystal composition of Examples 15 and 16 has a liquid crystal layer temperature range which is practical as a liquid crystal composition for a TV, a great absolute value of the dielectric anisotropy, and a low viscosity and an optimal Δn. Using the liquid crystal composition of Examples 15 and 16, the VA liquid crystal display element shown in FIG. 1 was prepared, and when the burn-in, the dropping mark, the process compatibility and the solubility at low temperature were evaluated in the same manner described above, the evaluation results were excellent.

Examples 17 and 18

The liquid crystal composition having the composition described below was prepared, and the physical properties thereof were measured. The results are shown in the following Table.

Using the liquid crystal composition of Examples 17 and 18, a VA liquid crystal display element was prepared in the same manner as in Example 1, and the burn-in, the dropping mark, the process compatibility and the solubility at low temperature were evaluated, and the results are shown in the same Table.

TABLE 1

| Example 17 | |
|---|---|
| 3CyCy2 | 19% |
| 3CyPhO1 | 8% |
| 3CyCyPh1 | 9% |
| 3CyPh5O2 | 15% |
| 3CyCyPh5O2 | 7% |
| 3CyCyPh5O3 | 6% |
| 4CyCyPh5O2 | 6% |
| 2CyPhPh5O2 | 9% |
| 3CyPhPh5O2 | 9% |
| 3PhPh5Ph2 | 6% |
| 4PhPh5Ph2 | 6% |
| $T_{NI}$/° C. | 87.8 |
| $\Delta n$ | 0.116 |
| $n_o$ | 1.489 |
| $\Delta\epsilon$ | −3.2 |
| $\epsilon_\perp$ | 6.9 |
| $\eta$/mPa·s | 26.4 |
| $\gamma_1$/mPa·s | 184 |
| $\gamma_1/\Delta n^2 \times 10^{-3}$ | 13.7 |
| Initial voltage holding ratio/% | 99.6 |
| Voltage holding ratio after 1 hour at 150° C./% | 99.2 |
| Evaluation of burn-in | B |
| Evaluation of dropping mark | A |
| Evaluation of process compatibility | A |
| Evaluation of solubility at low temperatures | B |
| Example 18 | |
| 3CyCy2 | 20% |
| 3CyCy4 | 9% |
| 3CyCy5 | 4% |
| 3CyPh5O2 | 18% |
| 3CyCyPh5O2 | 11% |

TABLE 1-continued

| | |
|---|---|
| 3CyCyPh5O3 | 11% |
| 4CyCyPh5O2 | 11% |
| 2CyPhPh5O2 | 5% |
| 3CyPhPh5O2 | 5% |
| 3PhPh5Ph2 | 3% |
| 4PhPh5Ph2 | 3% |
| $T_{NI}$/° C. | 87.1 |
| $\Delta n$ | 0.094 |
| $n_o$ | 1.480 |
| $\Delta\epsilon$ | −3.8 |
| $\epsilon_\perp$ | 7.5 |
| $\eta$/mPa·s | 25.1 |
| $\gamma_1$/mPa·s | 157 |
| $\gamma_1/\Delta n^2 \times 10^{-3}$ | 17.8 |
| Initial voltage holding ratio/% | 99.7 |
| Voltage holding ratio after 1 hour at 150° C./% | 99.1 |
| Evaluation of burn-in | B |
| Evaluation of dropping mark | B |
| Evaluation of process compatibility | A |
| Evaluation of solubility at low temperatures | B |

It is understood that the liquid crystal composition of Examples 17 and 18 has a liquid crystal layer temperature range which is practical as a liquid crystal composition for a TV, a great absolute value of the dielectric anisotropy, and a low viscosity and an optimal Δn. Using the liquid crystal composition of Examples 17 and 18, the VA liquid crystal display element shown in FIG. 1 was prepared, and when the burn-in, the dropping mark, the process compatibility and the solubility at low temperature were evaluated in the same manner described above, the evaluation results were excellent.

Examples 19 and 20

The liquid crystal composition having the composition described below was prepared, and the physical properties thereof were measured. The results are shown in the following Table.

Using the liquid crystal composition of Examples 19 and 20, a VA liquid crystal display element was prepared in the same manner as in Example 1, and the burn-in, the dropping mark, the process compatibility and the solubility at low temperature were evaluated, and the results are shown in the same Table.

TABLE 1

| Example 19 | |
|---|---|
| 3CyCy2 | 20% |
| 3CyCy4 | 6% |
| 3CyPhO1 | 3% |
| 3CyCyPh1 | 3% |
| 3CyPh5O2 | 17% |
| 3CyCyPh5O2 | 9% |
| 3CyCyPh5O3 | 8% |
| 4CyCyPh5O2 | 8% |
| 2CyPhPh5O2 | 9% |
| 3CyPhPh5O2 | 9% |
| 3PhPh5Ph2 | 4% |
| 4PhPh5Ph2 | 4% |
| $T_{NI}$/° C. | 87.8 |
| $\Delta n$ | 0.107 |
| $n_o$ | 1.484 |
| $\Delta\epsilon$ | −3.8 |
| $\epsilon_\perp$ | 7.6 |
| $\eta$/mPa·s | 26.7 |
| $\gamma_1$/mPa·s | 175 |
| $\gamma_1/\Delta n^2 \times 10^{-3}$ | 15.3 |
| Initial voltage holding ratio/% | 99.6 |
| Voltage holding ratio after 1 hour at 150° C./% | 99.1 |
| Evaluation of burn-in | A |

TABLE 1-continued

| | |
|---|---|
| Evaluation of dropping mark | B |
| Evaluation of process compatibility | A |
| Evaluation of solubility at low temperatures | B |
| Example 20 | |
| 3CyCy2 | 20% |
| 3CyCy4 | 9% |
| 3CyPh5O2 | 16% |
| 3CyCyPh5O2 | 7% |
| 3CyCyPh5O3 | 6% |
| 4CyCyPh5O2 | 6% |
| 2CyPhPh5O2 | 11% |
| 3CyPhPh5O2 | 11% |
| 3PhPh5Ph2 | 7% |
| 4PhPh5Ph2 | 7% |
| $T_{NI}/°C$ | 87.6 |
| $\Delta n$ | 0.117 |
| $n_o$ | 1.486 |
| $\Delta \epsilon$ | −3.8 |
| $\epsilon_\perp$ | 7.6 |
| $\eta/mPa \cdot s$ | 27.2 |
| $\gamma_1/mPa \cdot s$ | 187 |
| $\gamma_1/\Delta n^2 \times 10^{-3}$ | 13.7 |
| Initial voltage holding ratio/% | 99.5 |
| Voltage holding ratio after 1 hour at 150° C./% | 99.0 |
| Evaluation of burn-in | B |
| Evaluation of dropping mark | B |
| Evaluation of process compatibility | B |
| Evaluation of solubility at low temperatures | B |

It is understood that the liquid crystal composition of Examples 19 and 20 has a liquid crystal layer temperature range which is practical as a liquid crystal composition for a TV, a great absolute value of the dielectric anisotropy, and a low viscosity and an optimal Δn. Using the liquid crystal composition of Examples 19 and 20, the VA liquid crystal display element shown in FIG. 1 was prepared, and when the burn-in, the dropping mark, the process compatibility and the solubility at low temperature were evaluated in the same manner described above, the evaluation results were excellent.

Examples 21 and 22

The liquid crystal composition having the composition described below was prepared, and the physical properties thereof were measured. The results are shown in the following Table.

Using the liquid crystal composition of Examples 21 and 22, a VA liquid crystal display element was prepared in the same manner as in Example 1, and the burn-in, the dropping mark, the process compatibility and the solubility at low temperature were evaluated, and the results are shown in the same Table.

TABLE 1

| Example 21 | |
|---|---|
| 3CyCy2 | 20 |
| 3CyCy4 | 6 |
| 3CyCyPh1 | 10 |
| 3CyPhPh3 | 10 |
| 3CyPh5O2 | 16 |
| 3PhPh5O2 | 12 |
| 3CyCyPh5O2 | 4 |
| 3CyCyPh5O3 | 3 |
| 4CyCyPh5O2 | 3 |
| 2CyPhPh5O2 | 5 |
| 3CyPhPh5O2 | 5 |
| 3PhPh5Ph2 | 3 |
| 4PhPh5Ph2 | 3 |
| $T_{NI}/°C$ | 75.4 |

TABLE 1-continued

| | |
|---|---|
| $\Delta n$ | 0.106 |
| $n_o$ | 1.486 |
| $\Delta \epsilon$ | −3.4 |
| $\epsilon_\perp$ | 6.8 |
| $\eta/mPa \cdot s$ | 17.1 |
| $\gamma_1/mPa \cdot s$ | 112 |
| $\gamma_1/\Delta n^2 \times 10^{-3}$ | 10.0 |
| Initial voltage holding ratio/% | 99.7 |
| Voltage holding ratio after 1 hour at 150° C./% | 99.1 |
| Evaluation of burn-in | B |
| Evaluation of dropping mark | A |
| Evaluation of process compatibility | A |
| Evaluation of solubility at low temperatures | A |
| Example 22 | |
| 3CyCy2 | 20 |
| 3CyCyPh1 | 14 |
| 3CyPhPh3 | 12 |
| 3CyPh5O2 | 15 |
| 3PhPh5O2 | 10 |
| 3CyCyPh5O2 | 6 |
| 3CyCyPh5O3 | 6 |
| 4CyCyPh5O2 | 6 |
| 2CyPhPh5O2 | 5 |
| 3PhPh5Ph2 | 3 |
| 4PhPh5Ph2 | 3 |
| $T_{NI}/°C$ | 85.5 |
| $\Delta n$ | 0.106 |
| $n_o$ | 1.487 |
| $\Delta \epsilon$ | −3.3 |
| $\epsilon_\perp$ | 6.7 |
| $\eta/mPa \cdot s$ | 19.7 |
| $\gamma_1/mPa \cdot s$ | 130 |
| $\gamma_1/\Delta n^2 \times 10^{-3}$ | 11.6 |
| Initial voltage holding ratio/% | 99.6 |
| Voltage holding ratio after 1 hour at 150° C./% | 99.2 |
| Evaluation of burn-in | B |
| Evaluation of dropping mark | B |
| Evaluation of process compatibility | A |
| Evaluation of solubility at low temperatures | B |

It is understood that the liquid crystal composition of Examples 21 and 22 has a liquid crystal layer temperature range which is practical as a liquid crystal composition for a TV, a great absolute value of the dielectric anisotropy, and a low viscosity and an optimal Δn. Using the liquid crystal composition of Examples 21 and 22, the VA liquid crystal display element shown in FIG. 1 was prepared, and when the burn-in, the dropping mark, the process compatibility and the solubility at low temperature were evaluated in the same manner described above, the evaluation results were excellent.

Examples 23 and 24

The liquid crystal composition having the composition described below was prepared, and the physical properties thereof were measured. The results are shown in the following Table.

Using the liquid crystal composition of Examples 23 and 2, a VA liquid crystal display element was prepared in the same manner as in Example 1, and the burn-in, the dropping mark, the process compatibility and the solubility at low temperature were evaluated, and the results are shown in the same Table.

TABLE 1

| Example 23 | |
|---|---|
| 3CyCy2 | 22 |
| 3CyCy4 | 9 |
| 3CyCy5 | 2 |

TABLE 1-continued

| | |
|---|---|
| 3PhPh4Ph2 | 5 |
| 3CyPh5O2 | 18 |
| 3CyPh5O4 | 3 |
| 3CyCyPh5O2 | 5 |
| 3CyCyPh5O3 | 5 |
| 4CyCyPh5O2 | 5 |
| 2CyPhPh5O2 | 9 |
| 3CyPhPh5O2 | 9 |
| 3PhPh5Ph2 | 4 |
| 4PhPh5Ph2 | 4 |
| $T_{NI}/°C.$ | 76.1 |
| $\Delta n$ | 0.108 |
| $n_o$ | 1.483 |
| $\Delta\epsilon$ | −3.37 |
| $\epsilon_\perp$ | 7.16 |
| $\eta/mPa\cdot s$ | 21.4 |
| $\gamma_1/mPa\cdot s$ | 139 |
| $\gamma_1/\Delta n^2 \times 10^{-3}$ | 11.9 |
| Initial voltage holding ratio/% | 99.5 |
| Voltage holding ratio after 1 hour at 150° C./% | 99.1 |
| Evaluation of burn-in | B |
| Evaluation of dropping mark | B |
| Evaluation of process compatibility | A |
| Evaluation of solubility at low temperatures | B |
| Example 24 | |
| 3CyCy2 | 22 |
| 3CyCy4 | 6 |
| 3CyCyPh1 | 2 |
| 3PhPh4Ph2 | 8 |
| 3CyPh5O2 | 18 |
| 3PhPh5O2 | 5 |
| 3CyCyPh5O2 | 5 |
| 3CyCyPh5O3 | 5 |
| 4CyCyPh5O2 | 5 |
| 2CyPhPh5O2 | 8 |
| 3CyPhPh5O2 | 8 |
| 3PhPh5Ph2 | 4 |
| 4PhPh5Ph2 | 4 |
| $T_{NI}/°C.$ | 75.1 |
| $\Delta n$ | 0.117 |
| $n_o$ | 1.486 |
| $\Delta\epsilon$ | −3.65 |
| $\epsilon_\perp$ | 7.52 |
| $\eta/mPa\cdot s$ | 21.6 |
| $\gamma_1/mPa\cdot s$ | 141 |
| $\gamma_1/\Delta n^2 \times 10^{-3}$ | 10.3 |
| Initial voltage holding ratio/% | 99.4 |
| Voltage holding ratio after 1 hour at 150° C./% | 99.1 |
| Evaluation of burn-in | B |
| Evaluation of dropping mark | B |
| Evaluation of process compatibility | A |
| Evaluation of solubility at low temperatures | B |

It is understood that the liquid crystal composition of Examples 23 and 24 has a liquid crystal layer temperature range which is practical as a liquid crystal composition for a TV, a great absolute value of the dielectric anisotropy, and a low viscosity and an optimal Δn. Using the liquid crystal composition of Examples 23 and 2, the VA liquid crystal display element shown in FIG. 1 was prepared, and when the burn-in, the dropping mark, the process compatibility and the solubility at low temperature were evaluated in the same manner described above, the evaluation results were excellent.

REFERENCE SIGNS LIST

1 Polarizer
2 Substrate
3 Transparent electrode or transparent electrode with an active element
4 Alignment film
5 Liquid crystal
11 Gate electrode
12 Anodic oxide film
13 Gate insulating layer
14 Transparent electrode
15 Drain electrode
16 Ohmic contact layer
17 Semiconductor layer
18 Protective film
19a Source electrode 1
19b Source electrode 2
100 Substrate
101 Protective film

The invention claimed is:

1. A liquid crystal composition with a negative dielectric anisotropy, comprising:
a compound represented by Formula (I) in a range of 10% by mass to 40% by mass; and

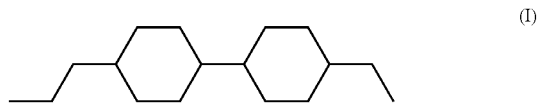 [SMILES: CCCC1CCC(C2CCC(CC)CC2)CC1]
(I)

a compound represented by General Formula (VII-a2) in a range of 5% by mass to 40% by mass;

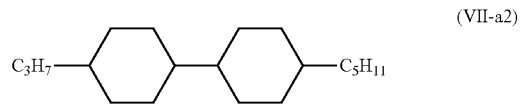
(VII-a2)

a compound represented by General Formula (II) of equal to or more than 15% by mass,

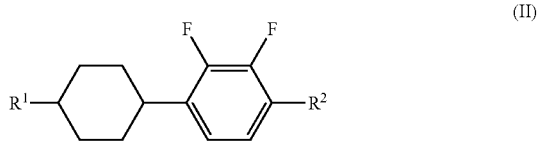
(II)

wherein each of $R^1$ and $R^2$ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms; one or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded; and wherein the liquid crystal composition comprises a compound represented by General Formula (III):

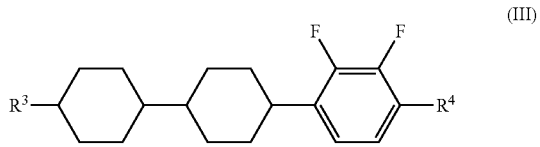
(III)

wherein each of R³ and R⁴ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms; one or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded.

2. The liquid crystal composition according to claim 1, wherein the liquid crystal composition comprises the compound represented by General Formula (I) in the range of 10% by mass to 35% by mass.

3. The liquid crystal composition according to claim 1, wherein the liquid crystal composition comprises the compound represented by General Formula (II) in the range of 25% by mass to 40% by mass.

4. The liquid crystal composition according to claim 1, wherein the liquid crystal composition comprises at least two or more kinds of the compounds represented by General Formula (II).

5. The liquid crystal composition according to claim 1, wherein, in General Formula (II), R¹ represents an alkyl group having 3 to 5 carbon atoms or an alkenyl group having 2 to 5 carbon atoms, and R² represents an alkoxy group having 2 to 4 carbon atoms or an alkenyl group having 3 to 5 carbon atoms.

6. The liquid crystal composition according to claim 1, wherein the liquid crystal composition comprises a compound represented by Formula (II-1) in an amount equal to or more than 15% by mass:

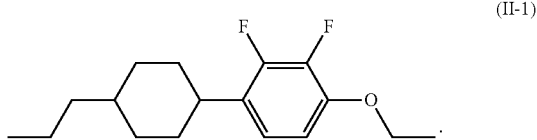 [SMILES: CCCC1CCC(c2ccc(OCC)c(F)c2F)CC1]

(II-1)

7. The liquid crystal composition according to claim 1, wherein the liquid crystal composition further comprises a compound represented by General Formula (IV):

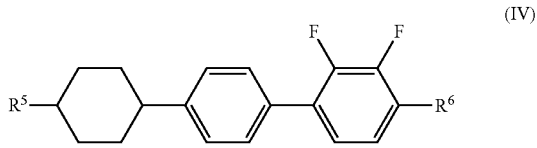

(IV)

wherein each of R⁵ and R⁶ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms; one or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded.

8. The liquid crystal composition according to claim 1, wherein the liquid crystal composition further comprises a compound represented by Formula (V):

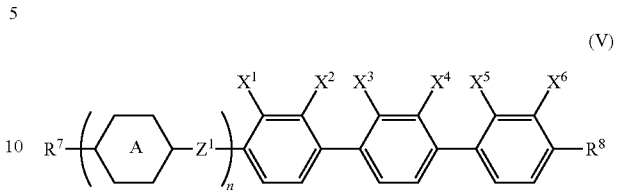

(V)

wherein each of R⁷ and R⁸ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms; one or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded; A represents a 1,4-cyclohexylene cyclohexylene group, a 1,4-phenylene group or a tetrahydropyran-2,5-diyl group, and in the case where A represents a 1,4-phenylene group, one or more hydrogen atoms of the 1,4-phenylene group may be substituted with fluorine atoms; $Z^1$ represents a single bond, —OCH₂—, —OCF₂—, —CH₂O— or CF₂O—; n is 0 or 1; and each of $X^1$ to $X^6$ independently represents a hydrogen atom or a fluorine atom, provided that at least one of $X^1$ to $X^6$ represents fluorine atoms.

9. A liquid crystal composition, wherein the liquid crystal composition comprises the compound represented by Formula (I) according to claim 1 in a range of 15% by mass to 30% by mass, a compound represented by Formula (II-1):

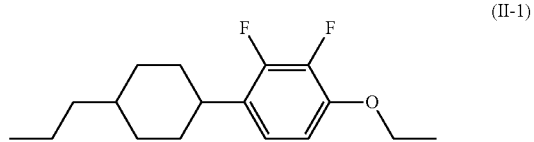 [SMILES: CCCC1CCC(c2ccc(OCC)c(F)c2F)CC1]

(II-1)

in a range of 15% by mass to 25% by mass, a compound represented by General Formula (III):

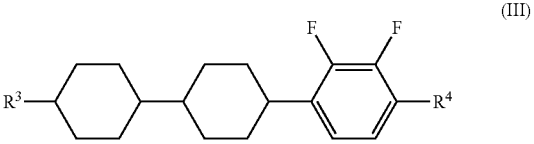

(III)

wherein each of R³ and R⁴ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms; one or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded in a range of 10% by mass to 20% by mass, a compound represented by General Formula (IV):

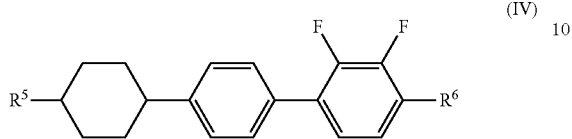

wherein each of $R^5$ and $R^6$ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms; one or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded in a range of 10% by mass to 25% by mass, and a compound represented by General Formula (V):

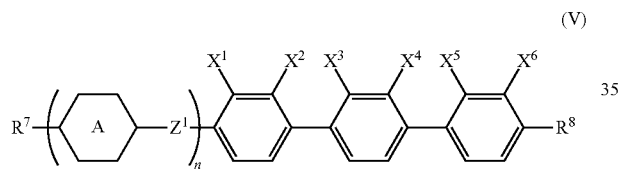

wherein each of $R^7$ and $R^8$ independently represents an alkyl group having 1 to 8 carbon atoms, an alkenyl group having 2 to 8 carbon atoms, an alkoxy group having 1 to 8 carbon atoms or an alkenyloxy group having 2 to 8 carbon atoms; one or more hydrogen atoms of the alkyl group, the alkenyl group, the alkoxy group or the alkenyloxy group may be substituted with fluorine atoms, and the methylene groups of the alkyl group, the alkenyl group, the alkoxy group or the alkenyloxy group may be substituted with oxygen atoms unless the oxygen atoms are continuously bonded, or may be substituted with carbonyl groups unless the carbonyl groups are continuously bonded; A represents a 1,4-cyclohexylene cyclohexylene group, a 1,4-phenylene group or a tetrahydropyran-2,5-diyl group, and in the case where A represents a 1,4-phenylene group, one or more hydrogen atoms of the 1,4-phenylene group may be substituted with fluorine atoms; $Z^1$ represents a single bond, —OCH$_2$—, —OCF$_2$—, —CH$_2$O— or CF$_2$O—; n is 0 or 1; and each of $X^1$ to $X^6$ independently represents a hydrogen atom or a fluorine atom, provided that at least one of $X^1$ to $X^6$ represents fluorine atoms in a range of 0% by mass to 20% by mass.

10. The liquid crystal composition according to claim 1, further comprising a reactive monomer.

11. A liquid crystal display element, using the liquid crystal composition according to claim 1.

12. A liquid crystal display element, using the liquid crystal composition according to claim 10.

13. A liquid crystal display, using the liquid crystal display element according to claim 11.

14. The liquid crystal composition according to claim 1, further comprising a compound selected from the group consisting of the compounds represented by General Formula (VII-a) to (VII-e):

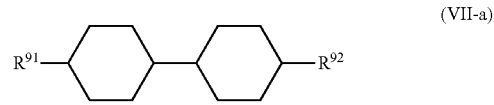

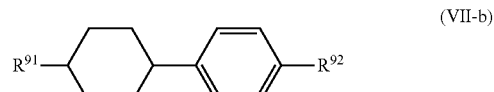

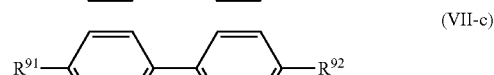

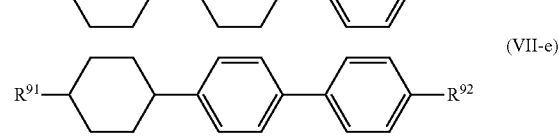

in the formulae, each of $R^{91}$ and $R^{92}$ independently represents an alkyl group having 1 to 10 carbon atoms, an alkoxy group having 1 to 10 carbon atoms or an alkenyl group having 2 to 10 carbon atoms, but in General Formula (VII-a), the compound in which $R^{91}$ represents an alkyl group having 3 carbon atoms and $R^{92}$ represents an alkyl group having 2 carbon atoms or 5 carbon atoms is excluded.

* * * * *